United States Patent
Fukuta

(10) Patent No.: US 9,693,335 B2
(45) Date of Patent: *Jun. 27, 2017

(54) RADIO BASE STATION AND METHOD OF CONTROLLING THE SAME

(71) Applicant: KYOCERA CORPORATION, Kyoto (JP)

(72) Inventor: Noriyoshi Fukuta, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/015,979

(22) Filed: Feb. 4, 2016

(65) Prior Publication Data

US 2016/0157204 A1 Jun. 2, 2016

Related U.S. Application Data

(63) Continuation of application No. 13/812,407, filed as application No. PCT/JP2011/066382 on Jul. 19, 2011, now Pat. No. 9,295,025.

(30) Foreign Application Priority Data

Jul. 28, 2010 (JP) ................................. 2010-169797

(51) Int. Cl.
*H04W 24/00* (2009.01)
*H04W 64/00* (2009.01)
(Continued)

(52) U.S. Cl.
CPC ........... *H04W 64/003* (2013.01); *H04W 8/22* (2013.01); *H04W 24/08* (2013.01); *H04W 16/26* (2013.01); *H04W 36/32* (2013.01); *H04W 88/08* (2013.01)

(58) Field of Classification Search
CPC ..... H04W 64/003; H04W 8/22; H04W 24/08; H04W 16/26; H04W 36/32; H04W 88/08
(Continued)

(56) References Cited

U.S. PATENT DOCUMENTS 8,498,609 B2  7/2013  Hamabe et al.
8,831,610 B2  9/2014  Ninagawa
(Continued)

FOREIGN PATENT DOCUMENTS

EP   2 031 921 A1   3/2009
EP   2 071 882 A2   6/2009
(Continued)

OTHER PUBLICATIONS

3GPP TS 36305 V0.2.0; 3rd Generation Partnership Project; Technical Specification Group Radio Access Network; Evolved Universal Terrestrial Radio Access (E-UTRA); Stage 2 functional Specification of User Equipment (UE) positioning in E-UTRAN (Release 9); May 20, 2009.
(Continued)

*Primary Examiner* — Mong-Thuy Tran
(74) *Attorney, Agent, or Firm* — Studebaker & Brackett PC

(57) ABSTRACT

A radio base station (100) transmits a Capability Request message to a radio terminal (200), which is connected to the radio base station, to transmit terminal capability information that indicates positioning capability of the radio terminal, and receives a Capability Indication message transmitted from the radio terminal (200). The radio base station (100) determines, corresponding to the received Capability Indication message, whether positional information that indicates the geographical position of the radio terminal (200) can be acquired from the radio terminal (200).

3 Claims, 14 Drawing Sheets

(51) Int. Cl.
*H04W 8/22* (2009.01)
*H04W 24/08* (2009.01)
*H04W 16/26* (2009.01)
*H04W 36/32* (2009.01)
*H04W 88/08* (2009.01)

(58) Field of Classification Search
USPC ......... 455/456.2, 67.11, 457, 456.6; 370/241
See application file for complete search history.

(56) References Cited

U.S. PATENT DOCUMENTS

| | | |
|---|---|---|
| 8,848,653 B2 | 9/2014 | Edge et al. |
| 2003/0060197 A1 | 3/2003 | Benes et al. |
| 2006/0009235 A1 | 1/2006 | Sheynblat et al. |
| 2007/0086387 A1 | 4/2007 | Kang et al. |
| 2008/0096581 A1 | 4/2008 | Do et al. |
| 2008/0299992 A1 | 12/2008 | Eitan et al. |
| 2008/0318596 A1 | 12/2008 | Tenny |
| 2009/0217357 A1 | 8/2009 | Dell'Uomo et al. |
| 2009/0257353 A1 | 10/2009 | Song et al. |
| 2011/0009130 A1 | 1/2011 | Wu |
| 2011/0086639 A1 | 4/2011 | Kalervo Hamalainen et al. |
| 2011/0159874 A1 | 6/2011 | Ninagawa |
| 2011/0195668 A1* | 8/2011 | Lee ................. H04W 24/10 455/67.11 |
| 2011/0201279 A1 | 8/2011 | Suzuki et al. |
| 2011/0250893 A1 | 10/2011 | Lee et al. |
| 2011/0268084 A1 | 11/2011 | Tanabe et al. |
| 2011/0269402 A1* | 11/2011 | Yi ................... H04W 24/08 455/67.11 |
| 2012/0088457 A1* | 4/2012 | Johansson ......... H04W 24/10 455/67.11 |
| 2012/0295623 A1 | 11/2012 | Siomina et al. |
| 2012/0309431 A1 | 12/2012 | Bodog |
| 2013/0064120 A1 | 3/2013 | Bodog et al. |
| 2013/0115970 A1* | 5/2013 | Hapsari ............. H04W 24/10 455/456.1 |

FOREIGN PATENT DOCUMENTS

| | | |
|---|---|---|
| JP | 2007-116697 A | 5/2007 |
| JP | 2009-010764 A | 1/2009 |
| JP | 2009-115573 A | 5/2009 |
| JP | 2010-056857 A | 3/2010 |
| JP | 2010-081282 A | 4/2010 |
| JP | 2010-531583 A | 9/2010 |
| KR | 2010-0022117 A | 2/2010 |
| KR | 2010-0063046 A | 6/2010 |
| WO | 2008/157841 A1 | 12/2008 |
| WO | 2009/011065 A1 | 1/2009 |
| WO | 2009/106615 A1 | 9/2009 |
| WO | 2010/002317 A | 1/2010 |

OTHER PUBLICATIONS

Procedure based LPP; 3GPP TSG-RAN3 Meeting #68; R2-096739; Ericsson; Nov. 9-13, 2009; Jeju, Korea.

3GPP TS 36.305 V9.3.0; 3rd Generation Partnership Project; Technical Specification Group Radio Access Network; Evolved Universal Terrestrial Radio Access Network (E-UTRAN); Stage 2 functional Specification of User Equipment (UE) positioning in E-UTRAN (Release 9); Jun. 2010.

International Search Report; PCT/JP2011/066382; Oct. 25, 2011.

Written Opinion; PCT/JP2011/066382; Oct. 14, 2011.

An Office Action; "Notice of Reason for Rejection," issued by the Japanese Patent Office on Jan. 14, 2014, which corresponds to Japanese Patent Application No. 2010-169797 and is related to U.S. Appl. No. 13/812,407; with English language statement of relevance.

An Office Action issued by the Korean Patent Office on Aug. 21, 2014, which corresponds to Korean Patent Application No. 10-2013-7004002 and is related to U.S. Appl. No. 13/812,407; with English language statement of relevance.

An Office Action issued by the Japanese Patent Office on Oct. 7, 2014, which corresponds to Japanese Patent Application No. 2010-169797 and is related to U.S. Appl. No. 13/812,407; with English language statement of relevance.

The first Office Action issued by the Chinese Patent Office on Dec. 12, 2014, which corresponds to Chinese Patent Application No. 201180036659.7 and is related to U.S. Appl. No. 13/812,407; with English language concise explanation.

QUALCOMM Europe; "Management aspects of minimization of drive tests (MDT)"; 3GPP TSG-RAN WG2 meeting #66bis; R2-094015; Jun. 29-Jul. 3, 2009; Los Angeles, US.

An Office Action; "Notice of Reasons for Rejection," issued by the Japanese Patent Office on Sep. 1, 2015, which corresponds to Japanese Patent Application No. 2015-123376 and is related to U.S. Appl. No. 13/812,407; with English language statement of relevance.

Huawei; "Location correlation for real-time measurements reporting"; 3GPP TSG-RAN WG2 Meeting #70; R2-102910; May 10-14, 2010; Montreal, Canada.

Nokia Siemens Networks, et al.; "Immediate MDT effect on network load"; 3GPP TSG-RAN WG2 Meeting #70; R2-103189; May 10-14, 2010; Montreal, Canada.

The extended European search report issued by the European Patent Office on Apr. 24, 2017, which corresponds to European Patent Application No. 11812321.5-1854 and is related to U.S. Appl. No. 15/015,979; 10 pp.

* cited by examiner

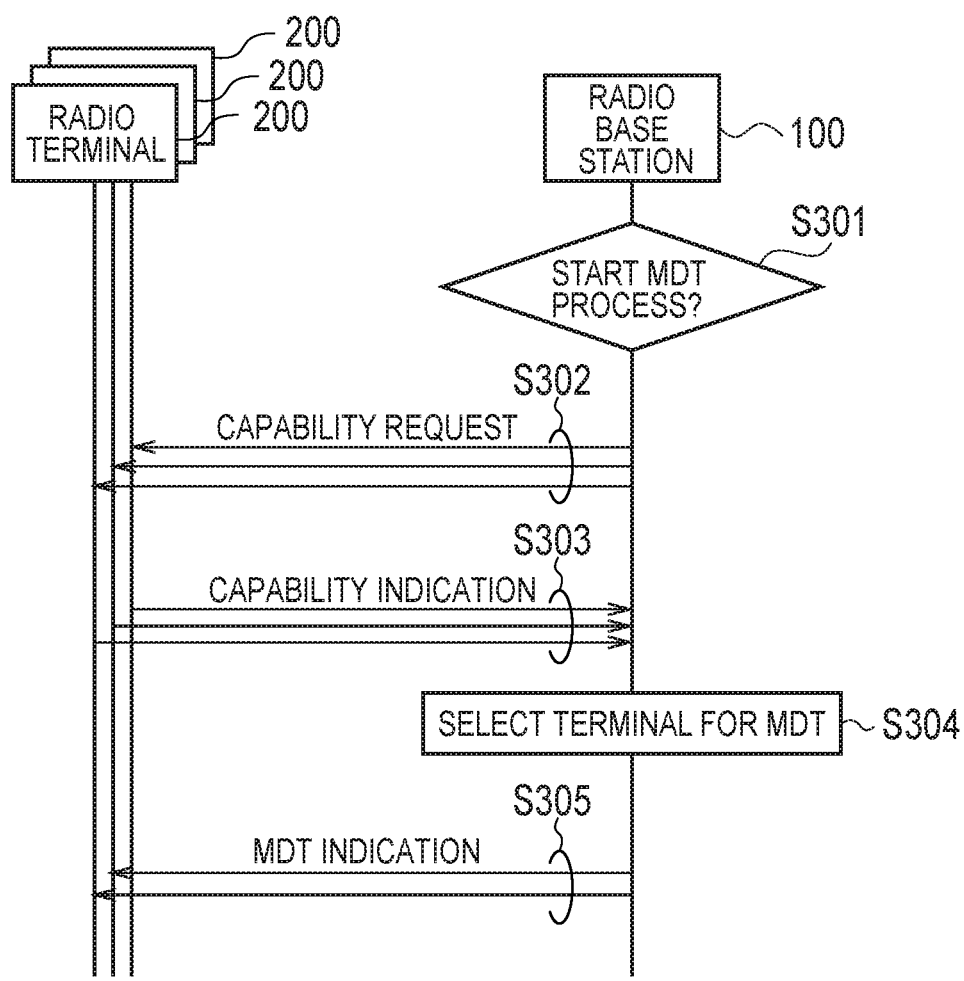

RADIO BASE STATION AND METHOD OF CONTROLLING THE SAME

TECHNICAL FIELD

The present invention relates to a radio base station that performs communications with a radio terminal and a method of controlling the same.

BACKGROUND ART

Recently, services using location information indicating a geographical location of a radio terminal (hereinafter abbreviated as "radio terminal location information" as needed) have been provided.

As the services become widely available, the 3GPP (3rd Generation Partnership Project) as a standardization organization for radio communication system promotes standardization of the positioning technique for acquiring radio terminal location information (see Non-patent Document 1).

The positioning technique includes a type where a radio terminal acquires location information by itself and a type where a location information server provided on a network side acquires location information. Here, the location information server is sometimes referred to as an E-SMLC (Evolved Serving Mobile Location Centre).

PRIOR ART DOCUMENTS

Non-Patent Document

Non-patent Document 1: 3GPP TS36.305: "Evolved Universal Terrestrial Radio Access Network (E-UTRAN); Stage functional specification of User Equipment (UE) positioning in E-UTRAN"

SUMMARY OF THE INVENTION

In this regard, if a radio base station can use radio terminal location information, advanced communication control can be implemented.

However, there is a problem that signaling occurs between a radio base station and a location information server when the radio base station acquires radio terminal location information from the location information server, which in turn increases network traffic.

Thus, an objective of the present invention is to provide a radio base station capable of suppressing an increase of network traffic even when carrying out a process requiring acquisition of radio terminal location information, and to provide a method of controlling the same.

The present invention has following features in order to solve the aforementioned problems. First, a feature of a radio base station according to the present invention is summarized as a radio base station comprising: a transmitter (transceiver 110) that transmits, to a radio terminal being connected to the radio base station, a capability information transmission request for requesting a transmission of terminal capability information indicating a positioning capability of the radio terminal; a receiver (transceiver 110) that receives the terminal capability information transmitted from the radio terminal; and a determination unit (capability determining unit 122) that determines whether or not location information indicating a geographical location of the radio terminal is acquirable from the radio terminal, based on the terminal capability information received by the receiver.

According to the above aspect, the radio base station can know the positioning capability of the radio terminal and can determine whether or not the radio terminal location information is acquirable from the radio terminal itself. Hence, if the radio terminal location information is acquirable from the radio terminal itself, a process of acquiring the radio terminal location information from a location information server can be omitted. Thus, no signaling occurs between the radio base station and the location information server, and an increase of network traffic can be thereby suppressed.

Another feature of a radio base station according to the present invention is, in the radio base station according to the aforementioned feature, summarized as follows. The transmitter transmits the capability information transmission request if a radio relay station is a handover candidate for the radio terminal.

Another feature of a radio base station according to the present invention is, in the radio base station according to the aforementioned feature, summarized as follows. The transmitter further transmits, to radio relay station, a capability information transmission request for requesting a transmission of relay station capability information indicating a positioning capability of the radio relay station, the receiver further receives the relay station capability information transmitted from the radio relay station, and the determination unit further determines whether or not location information indicating a geographical location of the radio relay station is acquirable from the radio relay station, based on the relay station capability information received by the receiver.

Another feature of a radio base station according to the present invention is, in the radio base station according to the aforementioned feature, summarized as follows. The radio base station further comprises: an acquisition unit (location information acquiring unit 123) that acquires location information from each of the radio terminal and the radio relay station if it is determined that the location information is acquirable from each of the radio terminal and the radio relay station; and a handover controller that controls handover of the radio terminal based on the location information acquired by the acquisition unit, wherein the handover controller restricts handover to the radio base station if a change in a relative distance between the radio terminal and the radio relay station is larger than a predetermined amount.

Another feature of a radio base station according to the present invention is, in the radio base station according to the aforementioned feature, summarized as follows. The transmitter transmits the capability information transmission request when a measurement process for acquiring radio quality information and location information is carried out by using the radio terminal.

Another feature of a radio base station according to the present invention is, in the radio base station according to the aforementioned feature, summarized as follows. The radio base station further comprises a selection unit (terminal selecting unit 127) that selects a radio terminal to be used for the measurement process among a plurality of radio terminals being connected to the radio base station, wherein the transmitter transmits the capability information transmission request to each of the plurality of radio terminals, the determination unit determines a positioning capability of each of the plurality of radio terminals based on the terminal capability information that the receiver receives from the radio terminal, and the selection unit selects the radio terminal to be used for the measurement process, based on determined positioning capabilities.

A feature of a controlling method according to the present invention is summarized as a method of controlling a radio base station comprising the steps of: transmitting, to a radio terminal being connected to the radio base station, a capability information transmission request for requesting a transmission of terminal capability information indicating a positioning capability of the radio terminal; receiving the terminal capability information transmitted from the radio terminal; and determining whether or not location information indicating a geographical location of the radio terminal is acquirable from the radio terminal, based on the terminal capability information received in the receiving step.

BRIEF DESCRIPTION OF THE DRAWINGS

FIG. 15 is a sequence diagram showing an operation sequence of the radio communication system according to the second embodiment.

DESCRIPTION OF THE EMBODIMENTS

Figure 1:
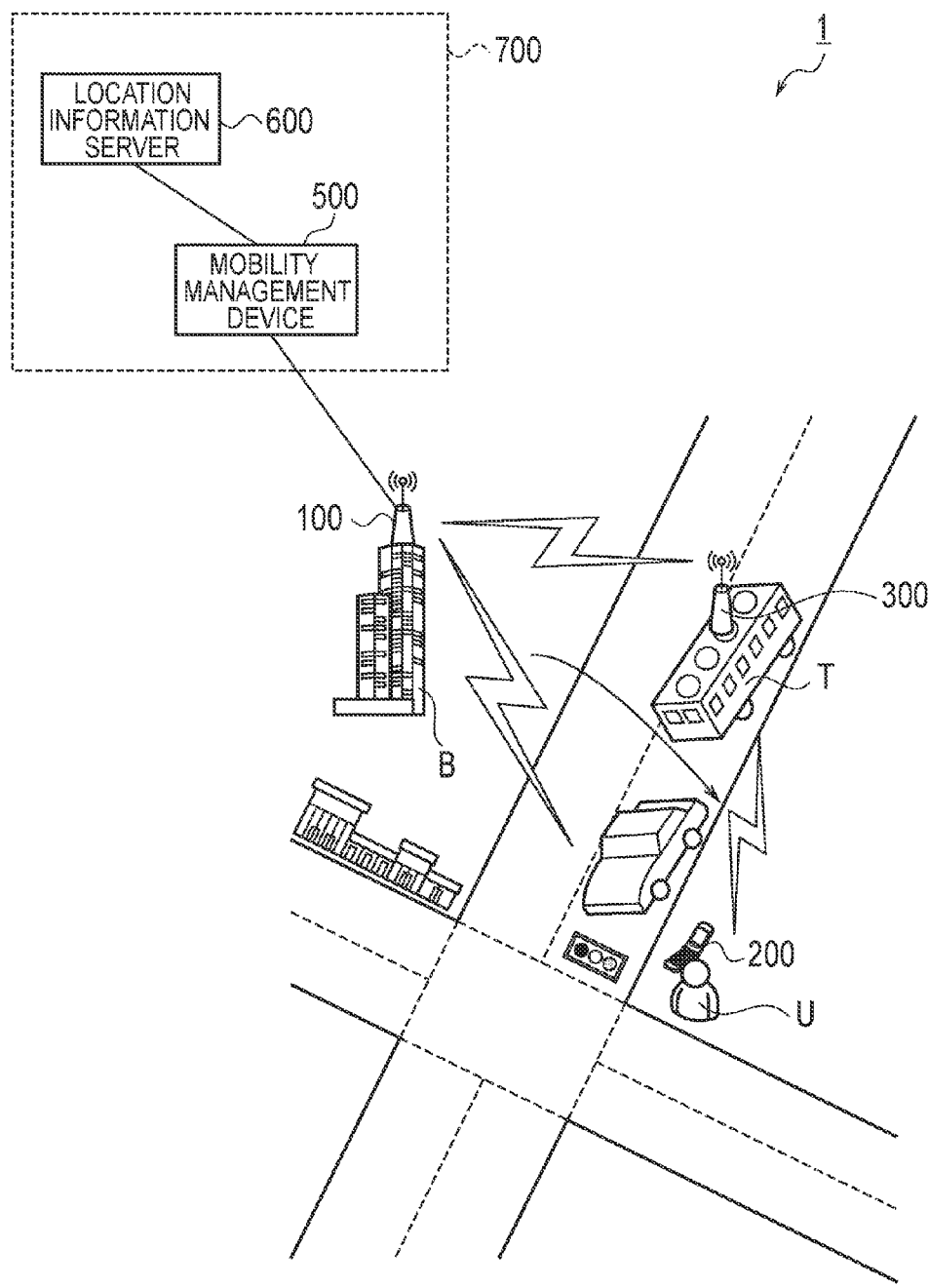
FIG. 1 is a diagram showing a schematic configuration of a radio communication system according to a first embodiment.

Hereinbelow, description is given of a first embodiment, a second embodiment, and other embodiments of the present invention. In the following description of the drawings of the embodiments, the same or similar parts are given the same or similar reference numerals.

(1) First Embodiment

The first embodiment is described in the following order: (1.1) Configuration of Radio Communication System; (1.2) Operation of Radio Communication System; and (1.3) Effect of First Embodiment.

(1.1) Configuration of Radio Communication System (1.1.1) Schematic Configuration of Radio Communication System FIG. 1 is a diagram showing a schematic configuration of a radio communication system 1 according to the first embodiment.

The radio communication system 1 according to the first embodiment includes: a radio base station 100; a radio terminal 200; and a relay node 300 (radio relay station). The radio communication system 1 is configured based, for example, on LTE-Advanced which is positioned as a fourth-generation (4G) mobile system.

The radio base station 100 is a macro base station which forms a cell having a radius of around several hundred meters, for example. The cell formed by the radio base station 100 indicates a communication area in which connection with the radio base station 100 can be achieved. In the example of FIG. 1, the radio base station 100 is installed in a building B and is immovable.

The radio base station 100 is connected to an unillustrated backhaul network. The backhaul network is a wired communication network. The radio base station 100 can communicate with another radio base station via the backhaul network.

The radio terminal 200 and the relay node 300 are located in the cell formed by the radio base station 100. The radio terminal 200 and the relay node 300 are connected to the radio base station 100 by radio.

The radio terminal 200 is held by a user U and is moved along with the movement of the user U. The radio terminal 200 may be a mobile terminal or may be a card-type communication terminal. The radio terminal 200 is connected to the radio base station 100 and performs radio communications directly with the radio base station 100. The radio terminal 200 executes handover which is a connection target change operation. The radio terminal 200 is capable of executing not only handover from one radio base station to another radio base station but also handover from one radio base station to one relay node.

The radio terminal 200 measures the radio quality of a radio signal received. Here, examples of the radio quality include the received power of a reference signal (RSRP) transmitted periodically and the received quality of the reference signal (RSRQ). The radio terminal 200 measures not only the radio quality of a radio signal received from the connection target radio base station 100 but also the radio quality of a receivable radio signal.

The radio terminal 200 measures the radio quality regularly. Alternatively, the radio terminal 200 may measure the radio quality when the level of the radio quality between itself and the connection target radio base station 100 falls below a predetermined level, for example.

A radio signal that the radio terminal 200 receives includes an identifier (cell ID) for identifying where the radio signal is transmitted from. The radio terminal 200 reports a result of the radio quality measurement to the radio base station 100 together with the cell ID. Such a report is referred to as a measurement report in LTE.

The relay node 300 is installed in transportation equipment T and moves along with the movement of the transportation equipment T. In FIG. 1, a bus is shown as an example of the transportation equipment T. The relay node 300 is a low-power output relay base station connected to the radio base station 100 by radio and having a radio backhaul. When the radio terminal 200 is connected to the relay node 300, the relay node 300 relays communications between the radio terminal 200 and the radio base station 100. In other words, when connected to the relay node 300, the radio terminal 200 communicates directly with the radio base station 100 via the relay node 300.

The radio base station 100 has a right to decide whether to perform handover in the radio terminal 200 connected to the radio base station 100. Upon receiving a handover instruction from the radio base station 100, the radio terminal 200 executes handover to a handover target specified by the radio base station 100.

Figure 10:
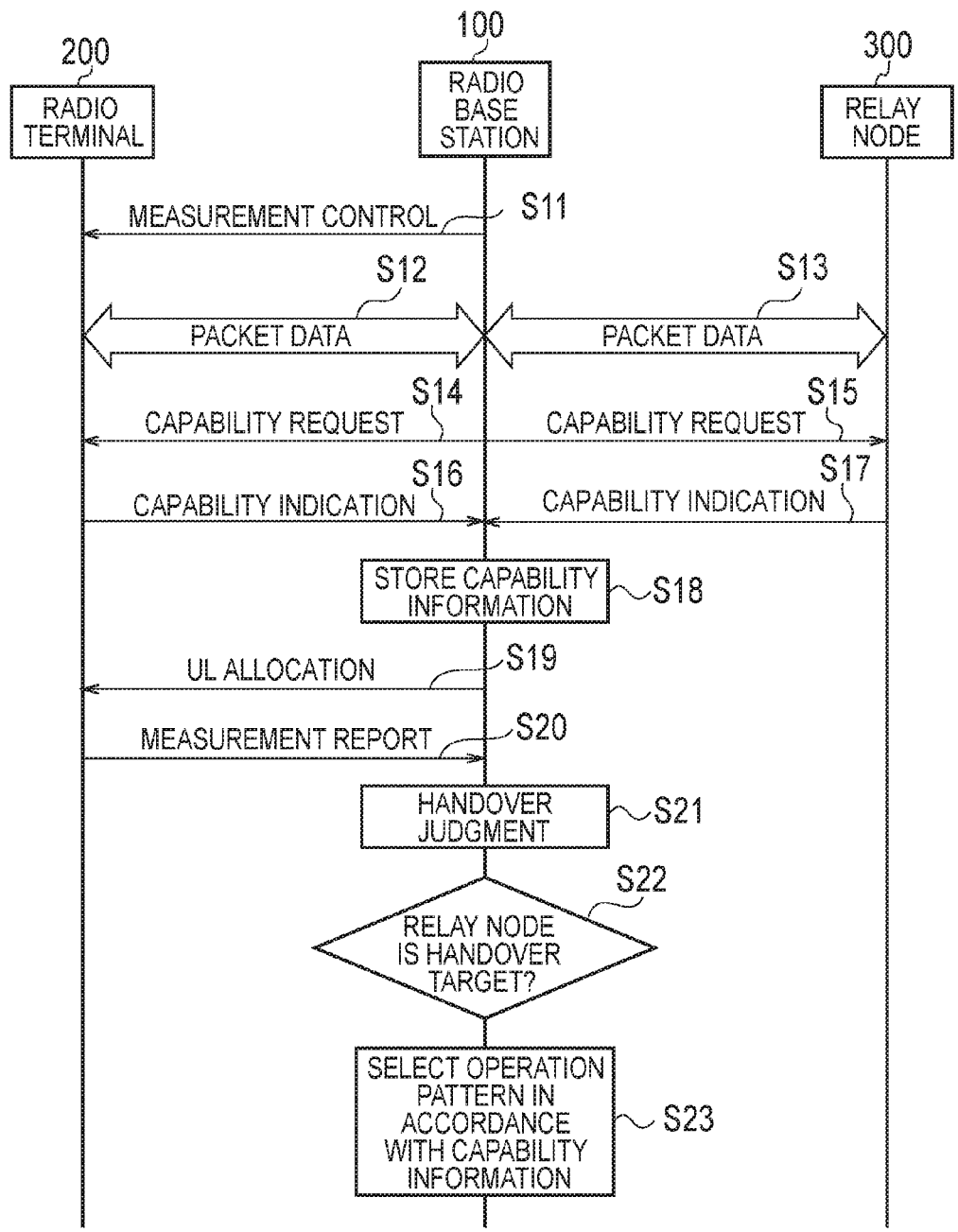
FIG. 10 is a sequence diagram showing an overall schematic operation of the radio communication system according to the first embodiment.

Specifically, the radio base station 100 knows a radio status of the radio terminal 200 based on the measurement report received from the radio terminal 200, and if handover to another radio base station is necessary, the radio base station 100 transmits a handover request to a handover target candidate radio base station via the backhaul network. Then, the radio base station 100 receives a response from the handover target candidate radio base station. If the handover target candidate radio base station is capable of accepting the radio terminal 200, the radio base station 100 transmits a handover instruction to the radio terminal 200. The radio terminal 200 disconnects the connection with the radio base station 100 and is then connected to the handover target radio base station, thereby completing handover. See, for example, 3GPP TS 36.300: "Evolved Universal Terrestrial Radio Access (E-UTRA) and Evolved Universal Terrestrial Radio Access Network (E-UTRAN); Overall description": Figure 10.1.2.1.1-1 Intra-MME/Serving Gateway HO for details of such procedures.

Meanwhile, the radio base station 100 knows the radio status of the radio terminal 200 based on the measurement report received from the radio terminal 200, and if handover to the relay node 300 is necessary, the radio base station 100 transmits a handover request to the handover target candidate relay node 300. Then, the radio base station 100 receives a response from the handover target candidate relay node 300. If the handover target candidate relay node 300 is capable of accepting the radio terminal 200, the radio base station 100 transmits a handover instruction to the radio terminal 200. The radio terminal 200 disconnects the connection with the radio base station 100 and is then connected to the handover target relay node 300, thereby completing handover.

A radio signal which is transmitted by the relay node 300 mounted on the transportation equipment T reaches the outside of the transportation equipment T. Hence, the relay node 300 becomes a handover target candidate for the radio terminal 200 connected to the radio base station 100 outside the transportation equipment T if the radio quality level of the radio signal received from the relay node 300 is equal to or higher than a predetermined level.

For example, if the radio quality level of a radio signal that the radio terminal 200 receives from the relay node 300 is equal to or lower than a threshold and if the radio quality level of a radio signal that the radio terminal 200 receives from the radio base station 100 is equal to or higher than the threshold, the relay node 300 becomes a handover target candidate for the radio terminal 200.

In the case where the radio terminal 200 executes handover to the relay node 300 installed in the transportation equipment T, the radio terminal 200 needs to execute handover from the relay node 300 to the radio base station 100 as soon as the radio terminal 200 or the relay node 300 is then moved because a communication area formed by the relay node 300 is small.

In the example of FIG. 1, the radio terminal 200 is located near the transportation equipment T being stopped waiting for a traffic signal to change. In the case where the radio terminal 200 executes handover from the radio base station 100 to the relay node 300, the radio terminal 200 needs to execute handover from the relay node 300 to the radio base station 100 as soon as the transportation equipment T restarts its movement. As a result, the handover from the radio base station 100 to the relay node 300 proves to be unnecessary.

Meanwhile, in the case where the radio terminal 200 is located in the transportation equipment T and moved along with the movement of the transportation equipment T, connection with the relay node 300 enables the radio terminal 200 to communicate with the radio base station 100 with a better condition than direct connection with the radio base station 100. More specifically, because having a more advanced radio communication function than the radio terminal 200, the relay node 300 is capable of performing better communications with the radio base station 100. Moreover, because this connection enables the radio terminal 200 to perform radio communications with less transmitted power, the radio terminal 200 can reduce its battery consumption.

Hence, the radio base station 100 controls handover from the radio base station 100 to the relay node 300 based on whether or not a state where there is no or small change in the relative distance between the radio terminal 200 and the relay node 300 is kept. If the state where there is no or small change in the relative distance therebetween is kept, the radio terminal 200 can be regarded as located in the transportation equipment T. By contrast, if the state where there is no or small change in the relative distance therebetween is not kept, the radio terminal 200 can be regarded as located outside the transportation equipment T.

A core network 700 includes: a mobility management device 500 being an upper-level device of the radio base station 100; and a location information server 600 that manages location information. In LTE, the mobility management device 500 is referred to as the MME (Mobility Management Entity) and the location information server 600 is referred to as the E-SMLC (Evolved Serving Mobile Location Centre).

The location information server 600 generates location information on the radio terminal 200 and location information on the relay node 300 by collecting differences in arrival time of radio signals that each of the radio terminal 200 and the relay node 300 receives from multiple radio base stations, base station IDs included in the radio signals, and the like, and manages these pieces of location information. Refer to Non-patent Document 1 for details of the location information server 600 (E-SMLC).

Figure 2:
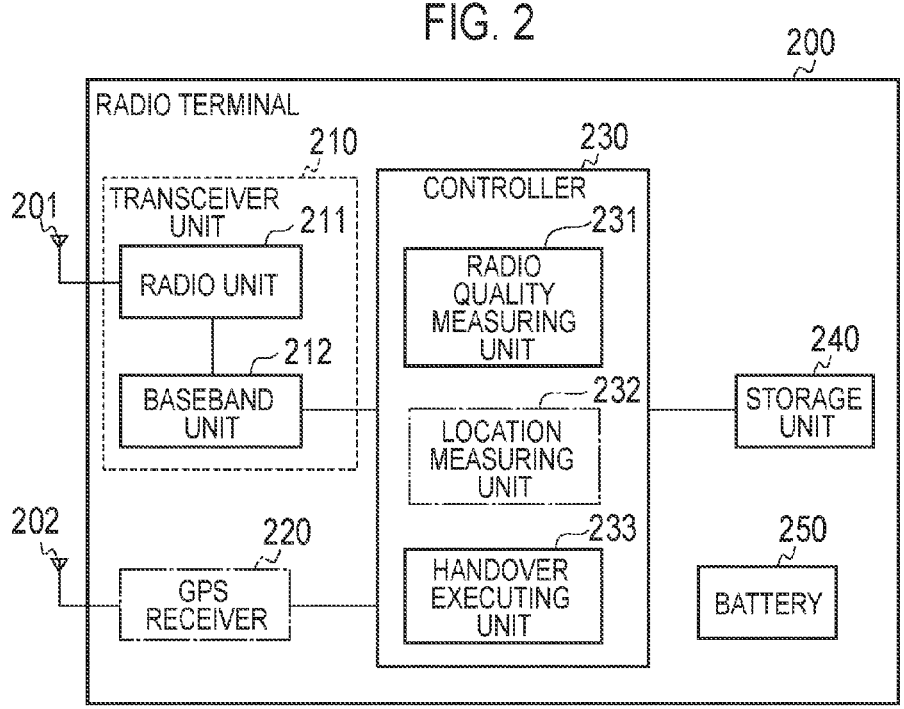
FIG. 2 is a block diagram showing a configuration of a radio terminal according to the first embodiment.

(1.1.2) Detailed Configuration of Radio Communication System (1.1.2.1) Configuration of Radio Terminal FIG. 2 is a block diagram showing a configuration of the radio terminal 200.

As shown in FIG. 2, the radio terminal 200 includes: an antenna 201; an antenna 202; a transceiver unit 210; a GPS receiver 220; a controller 230; a storage unit 240; and a battery 250.

The transceiver unit 210 includes: a radio unit 211 that processes signals in a radio frequency band (i.e., radio signals); and a baseband unit 212 that processes signals in a baseband. The transceiver unit 210 exchanges radio signals with the radio base station 100 or with the relay node 300 through the antenna 201.

The GPS receiver 220 receives a signal from a GPS satellite through the antenna 202. The controller 230 includes a CPU, for example, and controls various functions that the radio terminal 200 has. The storage unit 240 includes a memory, for example, and stores various kinds of information used for, for example, the control of the radio terminal 200. The battery 250 stores power to be supplied to the blocks of the radio terminal 200.

The controller 230 includes: a radio quality measuring unit 231; a location measuring unit 232; and a handover executing unit 233.

The radio quality measuring unit 231 regularly or irregularly measures the radio quality of a radio signal that the transceiver unit 210 receives. The transceiver unit 210 transmits, to the radio base station 100, a report on the result of measurement made by the radio quality measuring unit 231. The radio quality is RSRP, RSRQ, or the like, as described previously. As the report on the measurement result, the transceiver unit 210 may transmit the radio base station 100 a value of RSRP, RSRQ, or the like itself, or instead, an index of RSRP, RSRQ, or the like.

The location measuring unit 232 measures the location of the radio terminal 200 based on the signal that the GPS receiver 220 receives. The transceiver unit 210 transmits, to the radio base station 100, a report on the result of positioning made by the location measuring unit 232.

The handover executing unit 233 executes handover to a handover target specified by a handover instruction, when the transceiver unit 210 receives the handover instruction.

Note that there is a case where the radio terminal 200 does not have the antenna 202, the GPS receiver 220, and the location measuring unit 232. In this case, the radio terminal 200 is not capable of acquiring location information by itself.

Information on such positioning capability is stored in the storage unit 240 of the radio terminal 200 in advance. Upon request of the radio base station 100, the controller 230 of the radio terminal 200 performs control such that the transceiver unit 210 transmits, to the radio base station 100, the information on the positioning capability stored in the storage unit 240.

(1.1.2.2) Configuration of Relay Node

Figure 3:
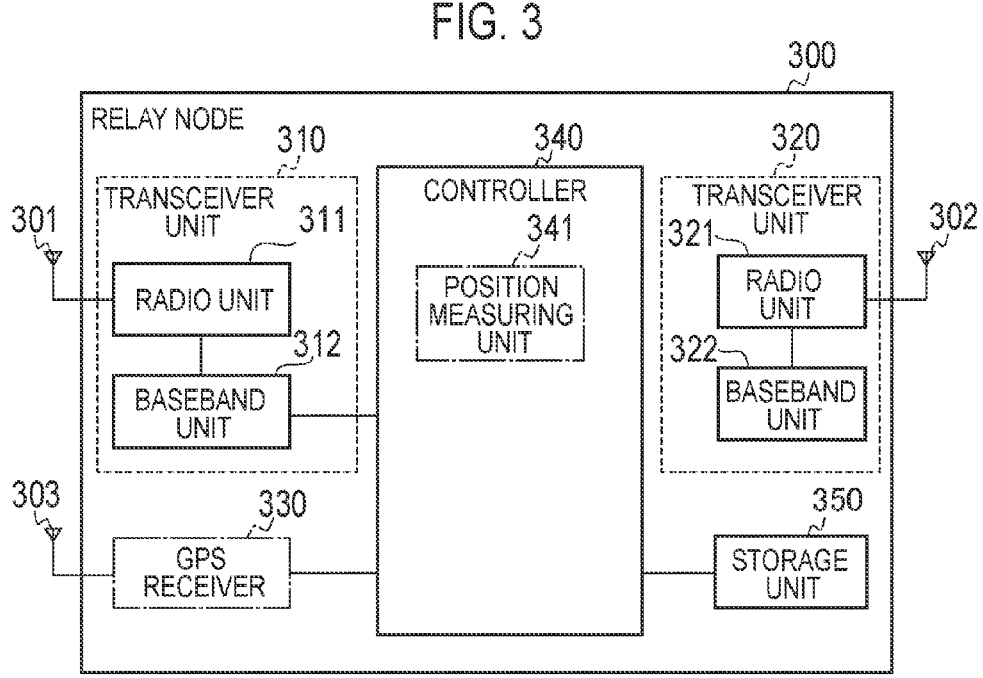
FIG. 3 is a block diagram showing a configuration of a relay node according to the first embodiment.

FIG. 3 is a block diagram showing a configuration of the relay node 300.

As shown in FIG. 3, the relay node 300 includes: an antenna 301; an antenna 302; an antenna 303; a transceiver unit 310; a transceiver unit 320; a GPS receiver 330; a controller 340; and a storage unit 350.

The transceiver unit 310 includes: a radio unit 311 that processes radio signals; and a baseband unit 312 that processes baseband signals. The transceiver unit 310 exchanges radio signals with the radio base station 100 through the antenna 301.

The transceiver unit 320 includes: a radio unit 321 that processes radio signals; and a baseband unit 322 that processes baseband signals. The transceiver unit 320 exchanges radio signals with the radio terminal 200 through the antenna 302.

Note that a single antenna may be used both as the antennas 301 and 302, and a single transceiver unit may be used both as the transceiver units 310 and 320; in this case, a function to control switching between transceiver is required.

The GPS receiver 330 receives a signal from a GPS satellite through the antenna 303. The controller 340 includes a CPU, for example, and controls various functions that the relay node 300 has. The storage unit 350 includes a memory, for example, and stores various kinds of information used for, for example, the control of the relay node 300.

The controller 340 includes a position measuring unit 341. The location measuring unit 341 measures the location of the relay node 300 based on the signal that the GPS receiver 330 receives. The transceiver unit 310 transmits, to the radio base station 100, a report on the result of positioning made by the location measuring unit 341.

Note that there is a case where the relay node 300 does not have the antenna 303, the GPS receiver 330, and the location measuring unit 341. In this case, the relay node 300 is not capable of acquiring location information by itself.

Information on such positioning capability is stored in the storage unit 350 of the relay node 300 in advance. Upon request of the radio base station 100, the controller 340 of the relay node 300 performs control such that the transceiver unit 310 transmits, to the radio base station 100, the information on the positioning capability stored in the storage unit 350.

(1.1.2.3) Configuration of Radio Base Station

Figure 4:
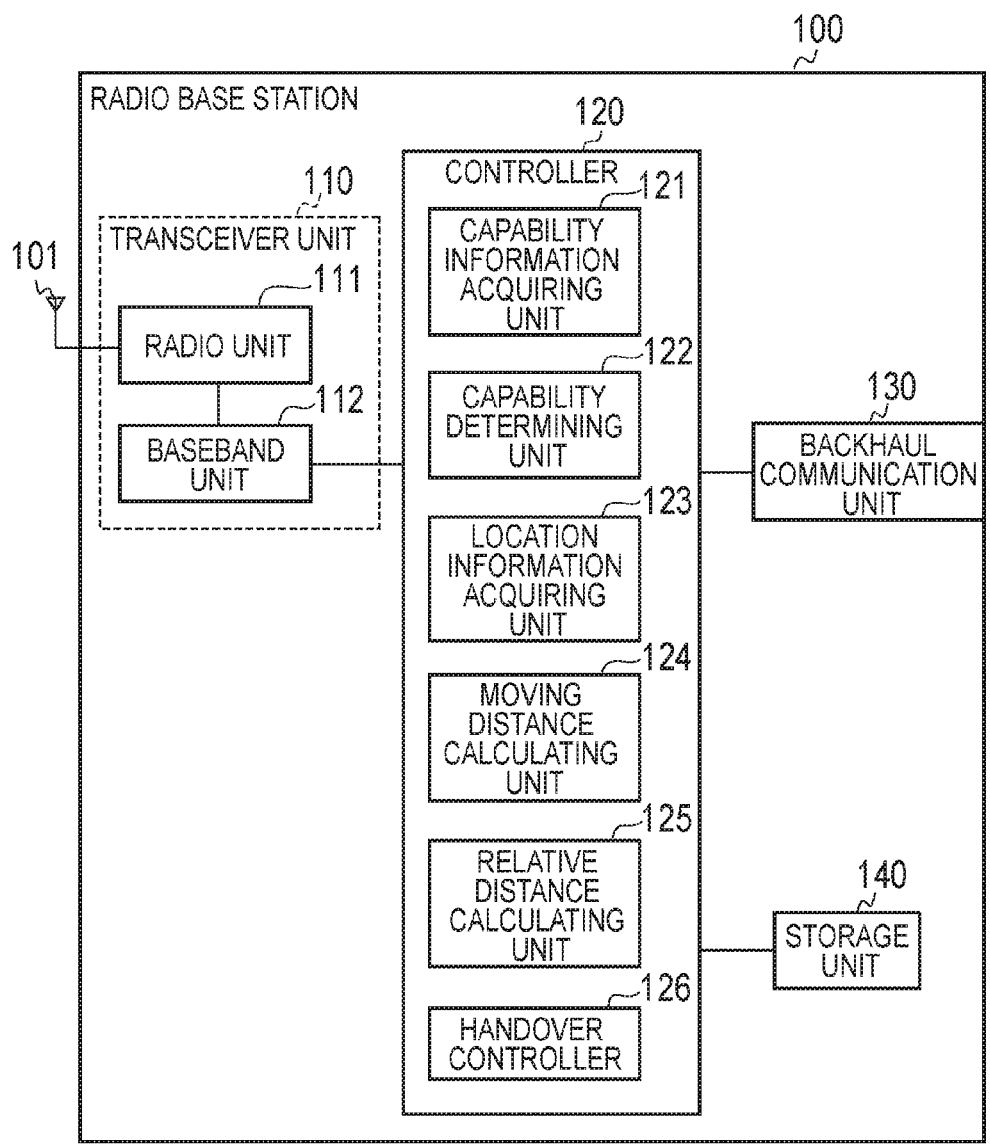
FIG. 4 is a block diagram showing a configuration of a radio base station according to the first embodiment.

FIG. 4 is a block diagram showing a configuration of the radio base station 100.

As shown in FIG. 4, the radio base station 100 includes: an antenna 101; a transceiver unit 110; a controller 120; a backhaul communication unit 130; and a storage unit 140.

The transceiver unit 110 includes: a radio unit 111 that processes radio signals; and a baseband unit 112 that processes baseband signals. The transceiver unit 110 exchanges radio signals with the radio terminal 200 or with the relay node 300 through the antenna 101.

The controller 120 includes a CPU, for example, and controls various functions that the radio base station 100 has. The backhaul communication unit 130 communicates with another radio base station via the backhaul network. The storage unit 140 includes a memory, for example, and stores various kinds of information used for, for example, the control of the radio base station 100.

The controller 120 includes: a capability information acquiring unit 121; a capability determining unit 122; a location information acquiring unit 123; a moving distance calculating unit 124; a relative distance calculating unit 125; and a handover controller 126.

The capability information acquiring unit 121 acquires information on the positioning capability of the radio terminal 200 being connected to the radio base station 100 (hereinafter terminal capability information) and information on the positioning capability of the relay node 300 being connected to the radio base station 100 (hereinafter relay node capability information).

The capability determining unit 122 determines whether or not location information of the radio terminal 200 being connected to the radio base station 100 is acquirable from the radio terminal 200 based on the terminal capability information. Moreover, the capability determining unit 122 determines whether or not location information of the relay node 300 being connected to the radio base station 100 is acquirable from the relay node 300 based on the relay node capability information.

The location information acquiring unit 123 acquires location information from each of the radio terminal 200 and the relay node 300 if it is determined that the location information is acquirable from each of the radio terminal 200 and the relay node 300. More specifically, the location information acquiring unit 123 acquires the location information of the radio terminal 200 based on the report on the measurement result that the transceiver unit 110 receives from the radio terminal 200. Moreover, the location information acquiring unit 123 acquires the location information of the relay node 300 based on the report on the measurement result that the transceiver unit 110 receives from the relay node 300.

The moving distance calculating unit 124 calculates a value indicating a moving distance of the radio terminal 200 in a predetermined time period, and a value indicating a moving distance of the relay node 300 in the predetermined time period. The moving distance calculation operation of the moving distance calculating unit 124 is described in detail later.

The relative distance calculating unit 125 calculates a value indicating the change in the relative distance between the radio terminal 200 and the relay node 300 in the predetermined time period, on the basis of the location information that the location information acquiring unit 123 acquires. The relative distance calculating unit 125 is equivalent to a first calculation unit. The relative distance calculation operation of the relative distance calculating unit 125 is described in detail later.

The handover controller 126 performs handover-related control. For example, the handover controller 126 decides a handover target and generates handover-related messages.

If the value indicating the change in the relative distance between the radio terminal 200 and the relay node 300 and calculated by the relative distance calculating unit 125 is equal to or smaller than a threshold, the handover controller 126 generates a message instructing the radio terminal 200 to execute handover from the radio base station 100 to the relay node 300. The transceiver unit 110 transmits the message to the radio terminal 200. If the value indicating the change in the relative distance therebetween is larger than the threshold, the handover controller restricts handover from the radio base station 100 to the relay node 300 executed by the radio terminal 200. The handover control operation of the handover controller 126 is described in detail later.

If the relay node 300 is a handover candidate for the radio terminal 200, the controller 120 performs control such that the transceiver unit 110 transmits, to the radio terminal 200 connected to the radio base station 100, a Capability Request message requesting a transmission of terminal capability information indicating the positioning capability of the radio terminal 200 (capability information transmission request). If the relay node 300 is a handover candidate for the radio terminal 200, the controller 120 performs control such that the transceiver unit 110 transmits, to the relay node 300 connected to the radio base station 100, a Capability Request message requesting a transmission of terminal capability information indicating the positioning capability of the relay node 300.

(1.1.2.4) Configuration of Mobility Management Device

Figure 5:
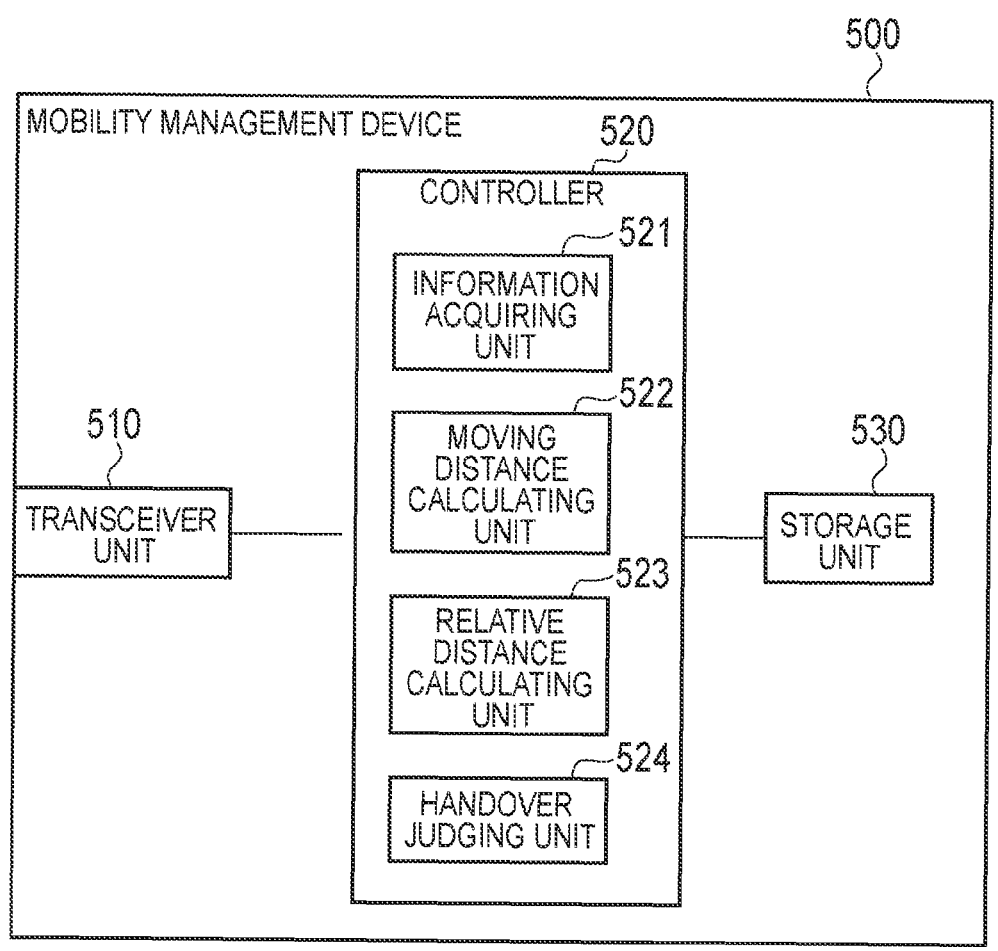
FIG. 5 is a block diagram showing a configuration of a mobility management device according to the first embodiment.

FIG. 5 is a block diagram showing a configuration of the mobility management device 500.

As shown in FIG. 5, the mobility management device 500 includes: a transceiver unit 510; a controller 520; and a storage unit 530.

The transceiver unit 510 is connected to the backhaul network, and communicates with the radio base station 100 and with the location information server 600 via the backhaul network. The transceiver unit 510 receives from the location information server 600 the location information of the radio terminal 200 and the location information of the relay node 300. The controller 520 includes a CPU, for example, and controls various functions that the mobility management device 500 has. The storage unit 530 includes a memory, for example, and stores various kinds of information used for, for example, the control of the mobility management device 500.

The controller 520 includes: an information acquiring unit 521; a moving distance calculating unit 522; a relative distance calculating unit 523; and a handover judging unit 524.

The information acquiring unit 521 acquires the location information that the transceiver unit 510 receives from the location information server 600. The moving distance calculating unit 522 calculates values indicating moving distances of the radio terminal 200 and the relay node 300 in the predetermined time period. The moving distance calculation operation of the moving distance calculating unit 522 is described in detail later.

The relative distance calculating unit 523 calculates a value indicating the change in the relative distance between the radio terminal 200 and the relay node 300 in the predetermined time period, on the basis of the location information that the information acquiring unit 521 acquires. The relative distance calculation operation of the relative distance calculating unit 523 is described in detail later.

The handover judging unit 524 makes handover-related judgment. More specifically, the handover judging unit 524 judges whether or not to allow the radio terminal 200 to execute handover to the relay node 300.

(1.2) Operation of Radio Communication System

Hereinbelow, description is given of an operation of the radio communication system 1 according to the first embodiment.

(1.2.1) Handover Control Operation

The radio base station 100 or the mobility management device 500 acquires location information of the radio terminal 200 and location information of the relay node 300, and controls the handover of the radio terminal 200 by using the acquired location information.

Such handover control operation is described below in the following order: (1.2.1.1) First Operation Example; (1.2.1.2) Second Operation Example; and (1.2.1.3) Third Operation Example.

(1.2.1.1) First Operation Example

Figure 6:
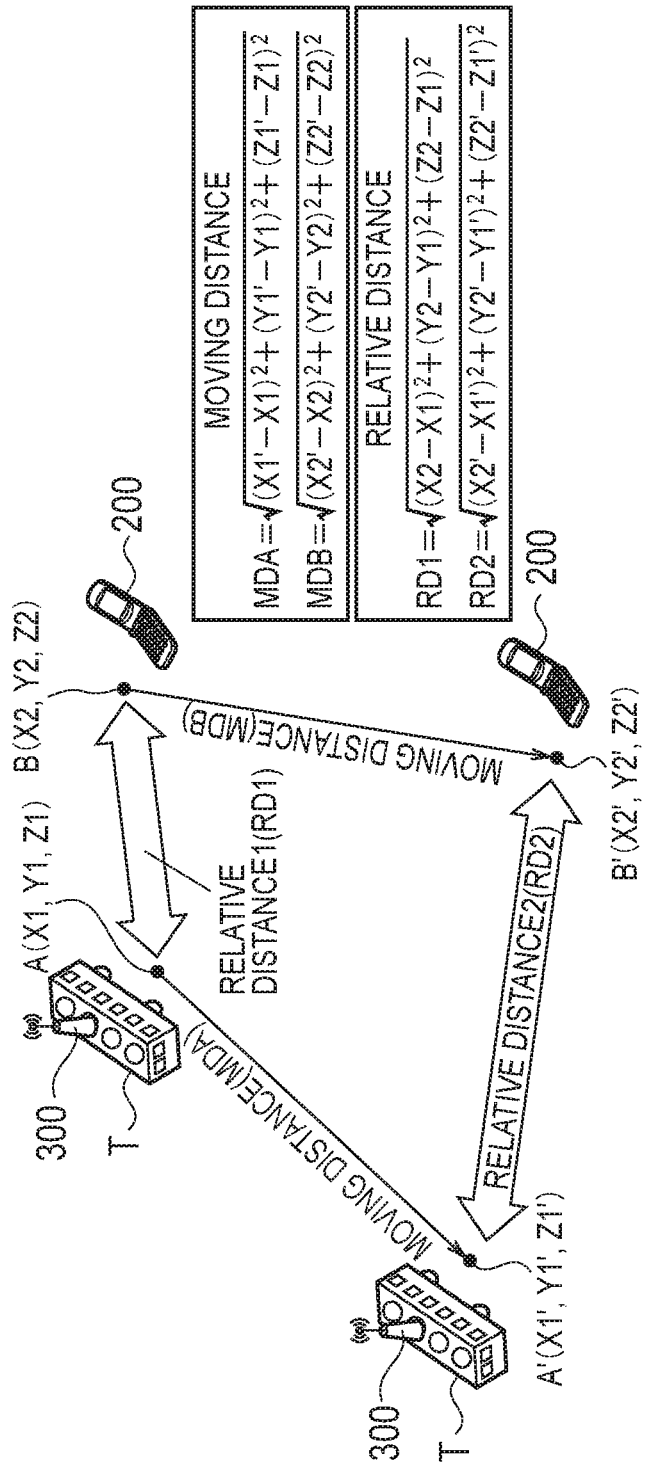
FIG. 6 is a diagram for describing a first operation example of a handover control operation according to the first embodiment (Part 1).
Figure 7:
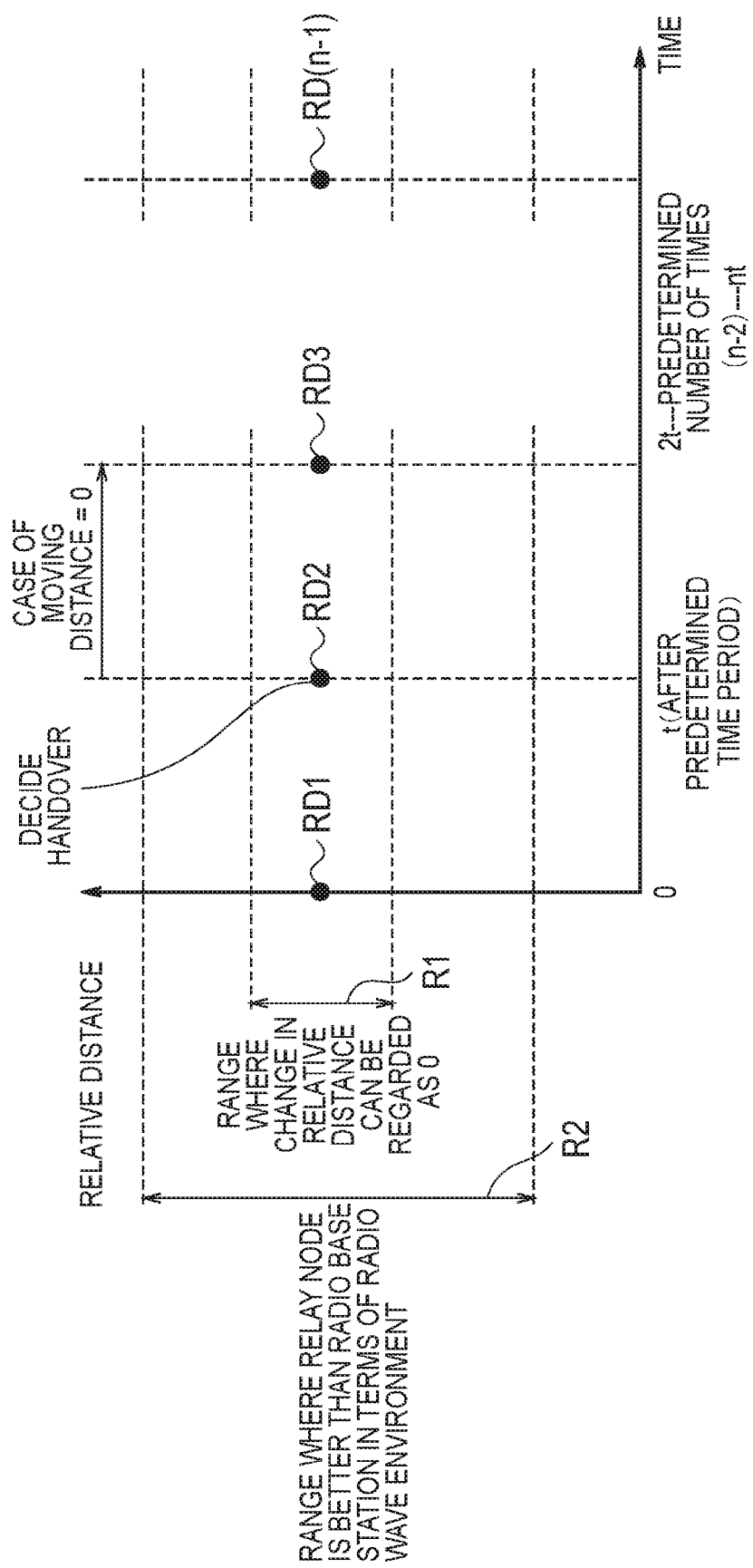
FIG. 7 is a diagram for describing the first operation example of the handover control operation according to the first embodiment (Part 2).

FIGS. 6 and 7 are diagrams for describing a first operation example of the handover control operation.

As shown in FIGS. 6 and 7, the radio base station 100 or the mobility management device 500 acquires location information A (X1, Y1, Z1) of the relay node 300 and location information B (X2, Y2, Z2) of the radio terminal 200 at timing 0 in a state where the level of the radio quality between the radio terminal 200 and the relay node 300 is higher than the level of the radio quality between the radio terminal 200 and the radio base station 100. Although the location information is defined by the X, Y, and Z coordinates here, the Z coordinate (vertical direction) does not necessarily have to be included in the location information.

The radio base station 100 or the mobility management device 500 acquires location information A' (X1', Y1', Z1') of the relay node 300 and location information B' (X2', Y2', Z2') of the radio terminal 200 at timing t, after a lapse of a predetermined time period since the timing 0, in the state where the level of the radio quality between the radio terminal 200 and the relay node 300 is higher than the level of the radio quality between the radio terminal 200 and the radio base station 100.

The radio base station 100 or the mobility management device 500 calculates a A-A' distance as a moving distance of the relay node 300 (MDA) and calculates a B-B' distance as a moving distance of the radio terminal 200 (MDB) by using a formula described in FIG. 6.

If at least one of the moving distance of the relay node 300 (MDA) and the moving distance of the radio terminal 200 (MDB) is larger than zero, the radio base station 100 or the mobility management device 500 calculates a A-B relative distance 1 (RD1) and calculates a A'-B' relative distance 2 (RD2) in accordance with a formula described in FIG. 6. The radio base station 100 or the mobility management device 500 then calculates a difference between the relative distance 1 (RD1) and the relative distance 2 (RD2) (|RD1-RD2|, for example). The difference between the relative distances calculated in this way indicates the change in the relative distance between the radio terminal 200 and the relay node 300.

If the difference between the relative distance 1 (RD1) and the relative distance 2 (RD2) is equal to or smaller than a threshold, the radio base station 100 transmits, to the radio terminal 200, an instruction of handover from the radio base station 100 to the relay node 300. In response, the radio terminal 200 executes handover from the radio base station 100 to the relay node 300.

In contrast, if both the moving distance of the relay node 300 (MDA) and the moving distance of the radio terminal 200 (MDB) are equal to zero, the radio base station 100 or the mobility management device 500 acquires location information A" (X1", Y1", Z1") of the relay node 300 and location information B' (X2", Y2", Z2") of the radio terminal 200 at timing 2t, after a lapse of a predetermined time period since the timing t, in the state where the level of the radio quality between the radio terminal 200 and the relay node 300 is higher than the level of the radio quality between the radio terminal 200 and the radio base station 100.

The radio base station 100 or the mobility management device 500 calculates an A-A" distance as a moving distance of the relay node 300 (MDA') and calculates a B-B" distance as a moving distance of the radio terminal 200 (MDB'). If at least one of the moving distance of the relay node 300 (MDA') and the moving distance of the radio terminal 200 (MDB') is larger than zero, the radio base station 100 or the mobility management device 500 calculates a A-B relative distance 1 (RD1) and calculates an A"-B" relative distance (RD2'). The radio base station 100 or the mobility management device 500 then calculates a difference between the relative distance 1 (RD1) and the relative distance 2 (RD2') (|RD1-RD2'|, for example). If the difference therebetween is equal to or smaller than a threshold, the radio base station 100 transmits, to the radio terminal 200, an instruction of handover from the radio base station 100 to the relay node 300.

As described so far, the radio base station performs control to make the radio terminal 200 execute handover from the radio base station 100 to the relay node 300 when the level of the radio quality between the radio terminal 200 and the relay node 300 is higher than the level of the radio quality between the radio terminal 200 and the radio base station 100 and when the value of the change (difference) in the relative distance is equal to or smaller than the threshold.

On the other hand, if the value of the change (difference) in the relative distance is larger than the threshold, the radio base station 100 performs control not to make the radio terminal 200 execute handover (to restrict handover of the radio terminal 200) from the radio base station 100 to the relay node 300 even when the level of the radio quality between the radio terminal 200 and the relay node 300 is higher than the level of the radio quality between the radio terminal 200 and the radio base station 100.

Such handover control makes it possible to make the radio terminal 200 execute handover to the relay node 300 when the radio terminal 200 is located in the transportation equipment T and not execute handover to the relay node 300 when the radio terminal 200 is not located in the transportation equipment T.

Besides, the value of the change (difference) in the relative distance is calculated when at least one of the moving distances of the radio terminal 200 and the relay node 300 is larger than zero. This is because it is difficult to judge whether or not the radio terminal 200 is located in the transportation equipment T when the moving distances of the radio terminal 200 and the relay node 300 are both equal to zero. Thereby, whether or not the radio terminal 200 is located in the transportation equipment T is judged more accurately.

(1.2.1.2) Second Operation Example

Figure 8:
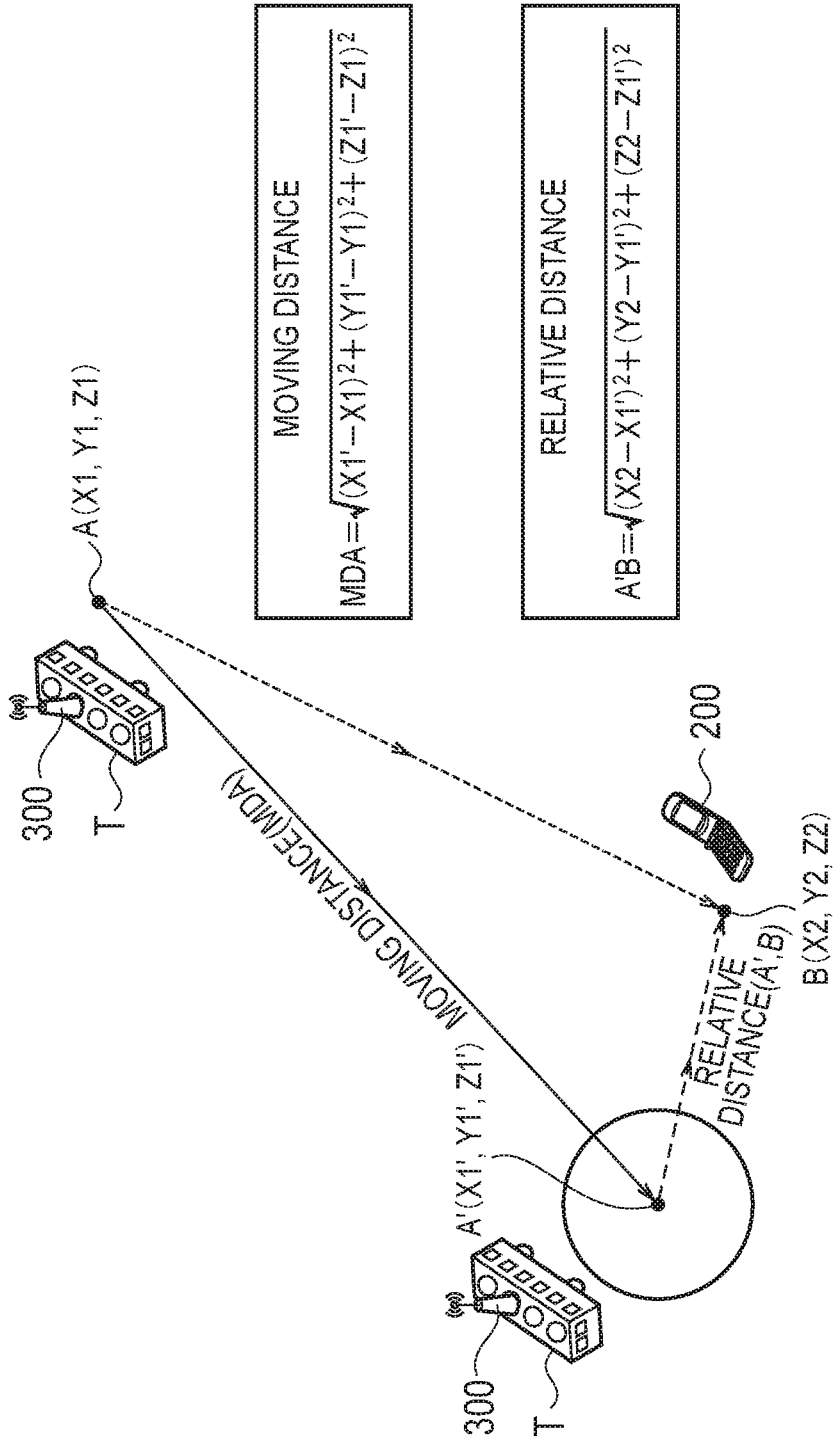
FIG. 8 is a diagram for describing a second operation example of the handover control operation according to the first embodiment.

FIG. 8 is a diagram for describing a second operation example of the handover control operation.

As shown in FIG. 8, the radio base station 100 or the mobility management device 500 acquires location information A (X1, Y1, Z1) of the relay node 300 at a first time point where the radio quality between the radio terminal 200 and the relay node 300 is at such a level that the radio terminal 200 is connectable to the relay node 300. The state where the radio terminal 200 is connectable to the relay node 300 denotes, for example, a state where the level of the radio quality between the radio terminal 200 and the relay node 300 is higher than the level of the radio quality between the radio terminal 200 and the radio base station 100.

The radio base station 100 or the mobility management device 500 acquires location information A' (X1', Y1', Z1') of the relay node 300 and location information B (X2, Y2, Z2) of the radio terminal 200 at a second time point after a lapse of a predetermined time period since the first time point.

The radio base station 100 or the mobility management device 500 calculates a A-A' distance as a moving distance of the relay node 300 (MDA) by using a formula described in FIG. 8.

If the moving distance of the relay node 300 (MDA) is larger than zero, the radio base station 100 or the mobility management device 500 calculates a A'-B relative distance (RD) at the second time point by using a formula described in FIG. 8. This example differs from the first operation example above in that the relative distance between the radio terminal 200 and the relay node 300 at the first time point is regarded as zero in this process. More specifically, because the transmitted power of the relay node 300 is small, it is possible to estimate that the radio terminal 200 is located near the relay node 300 if the radio terminal 200 is connectable to the relay node 300. Accordingly, the relative distance between the radio terminal 200 and the relay node 300 at the first time point can be regarded as zero.

The A'-B relative distance (RD) indicates the change in the relative distance between the radio terminal 200 and the relay node 300 in a predetermined time period (from the first time point to the second time point).

If the A'-B relative distance (RD) is equal to or smaller than a threshold, the radio base station 100 or the mobility management device 500 makes a judgment to allow (accept)

handover of the radio terminal 200 from the radio base station 100 to the relay node 300. The threshold is a value corresponding to a predetermined distance from the relay node 300 (an area equivalent to the inside of the transportation equipment T, for example), as shown by a circle about the relay node 300 in FIG. 8. The radio base station 100 instructs the radio terminal 200 to execute handover to the relay node 300 if allowing the handover.

Note that, if the moving distance (MDA) of the relay node 300 is equal to zero, the radio base station 100 or the mobility management device 500 acquires location information A" (X1", Y1", Z1") of the relay node 300 at a third time point after a lapse of a predetermined time period since the second time point. In this manner, the radio base station 100 or the mobility management device 500 iterates the acquisition of the location information of the relay node 300 for a predetermined number of times if the moving distance (MDA) of the relay node 300 is equal to zero.

Such handover control makes it possible to make the radio terminal 200 execute handover to the relay node 300 when the radio terminal 200 is located in the transportation equipment T and not execute handover to the relay node 300 when the radio terminal 200 is not located in the transportation equipment T, as in the first operation example.

(1.2.1.3) Third Operation Example

Figure 9:
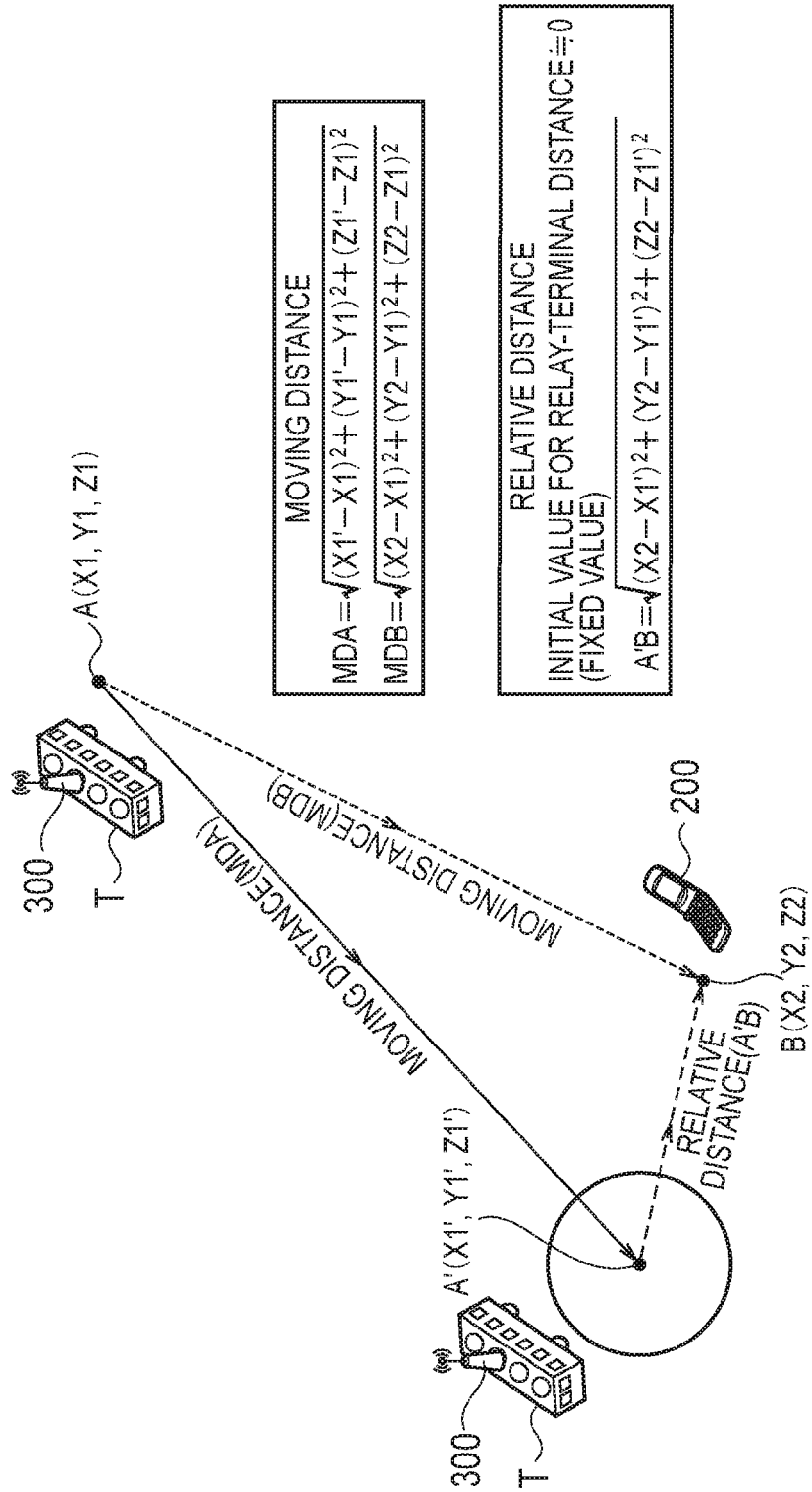
FIG. 9 is a diagram for describing a third operation example of the handover control operation according to the first embodiment.

FIG. 9 is a diagram for describing a third operation example of the handover control operation.

As shown in FIG. 9, the radio base station 100 or the mobility management device 500 acquires location information A (X1, Y1, Z1) of the relay node 300 at a first time point where the radio quality between the radio terminal 200 and the relay node 300 is at such a level that the radio terminal 200 is connectable to the relay node 300. The state where the radio terminal 200 is connectable to the relay node 300 denotes, for example, a state where the level of the radio quality between the radio terminal 200 and the relay node 300 is higher than the level of the radio quality between the radio terminal 200 and the radio base station 100.

The radio base station 100 or the mobility management device 500 acquires location information A' (X1', Y1', Z1') of the relay node 300 and location information B (X2, Y2, Z2) of the radio terminal 200 at a second time point after a lapse of a predetermined time period since the first time point.

The radio base station 100 or the mobility management device 500 calculates a A-A' distance as a moving distance of the relay node 300 (MDA) and calculates a A-B distance as a moving distance of the radio terminal 200 (MDB) by using a formula described in FIG. 9. This example differs from the first operation example above in that the relative distance between the radio terminal 200 and the relay node 300 at the first time point is regarded as zero and the location of the radio terminal 200 at the first time point is regarded as equal to the location of the relay node 300 in this process. More specifically, because the transmitted power of the relay node 300 is small, it is possible to estimate that the radio terminal 200 is located near the relay node 300 if the radio terminal 200 is connectable to the relay node 300. Accordingly, the relative distance between the radio terminal 200 and the relay node 300 at the first time point can be regarded as zero.

If at least one of the moving distance of the relay node 300 (MDA) and the moving distance of the radio terminal 200 (MDB) is larger than zero, the radio base station 100 or the mobility management device 500 calculates a A'-B relative distance (RD) at the second time point by using a formula described in FIG. 9. Because the relative distance between the radio terminal 200 and the relay node 300 at the first time point is regarded as zero, the A'-B relative distance (RD) thus calculated indicates the change in the relative distance between the radio terminal 200 and the relay node 300 in a predetermined time period (from the first time point to the second time point).

If the A'-B relative distance (RD) is equal to or smaller than a threshold, the radio base station 100 or the mobility management device 500 makes a judgment to allow (accept) handover of the radio terminal 200 from the radio base station 100 to the relay node 300. The threshold is a value corresponding to a predetermined distance from the relay node 300 (an area equivalent to the inside of the transportation equipment T, for example), as shown by a circle about the relay node 300 in FIG. 9. The radio base station 100 instructs the radio terminal 200 to execute handover to the relay node 300 if allowing the handover.

Note that, if the moving distance (MDA) of the relay node 300 and the moving distance (MDB) of the radio terminal 200 are equal to zero, the radio base station 100 or the mobility management device 500 acquires location information A" (X1", Y1", Z1") of the relay node 300 and location information B' (X2', Y2', Z2') of the radio terminal 200 at a third time point after a lapse of a predetermined time period since the second time point. In this manner, the radio base station 100 or the mobility management device 500 iterates the acquisition of the location information of the relay node 300 and the location information of the radio terminal 200 for a predetermined number of times if the moving distance (MDA) of the relay node 300 and the moving distance (MDB) of the radio terminal 200 are equal to zero.

Such handover control makes it possible to make the radio terminal 200 execute handover to the relay node 300 when the radio terminal 200 is located in the transportation equipment T and not execute handover to the relay node 300 when the radio terminal 200 is not located in the transportation equipment T, as in the first operation example.

(1.2.2) Operation Sequence of Radio Communication System

Next, an operation sequence of the radio communication system 1 according to the first embodiment is described in the following order: (1.2.2.1) Overall Schematic Operation; (1.2.2.2) First Operation Pattern; and (1.2.2.3) Second Operation Pattern.

(1.2.2.1) Overall Schematic Operation

FIG. 10 is a sequence diagram showing an overall schematic operation of the radio communication system 1 according to the first embodiment. It is assumed here that each of the radio terminal 200 and the relay node 300 connected to the radio base station 100 is currently performing communications (in the RRC Connected state).

As shown in FIG. 10, in Step S11, the radio base station transmits, to the radio terminal 200, information on Measurement Control over the radio quality in the radio terminal 200.

In Steps S12 and S13, the radio base station 100 exchanges packet data other than control data used for communication control, with the radio terminal 200 and the relay node 300. The packet data exchange continues in later processes as well.

In Step S14, the radio base station 100 transmits, to the radio terminal 200, a Capability Request message requesting a transmission of terminal capability information indicating the positioning capability of the radio terminal 200 (capability information transmission request).

In Step S15, the radio base station 100 transmits, to the relay node 300, a Capability Request message requesting a transmission of terminal capability information indicating the positioning capability of the relay node 300 (capability information transmission request).

In Step S16, the radio terminal 200 transmits, to the radio base station 100, a Capability Indication message indicating the positioning capability of the radio terminal 200 (terminal capability information) in response to the Capability Request message from the radio base station 100.

In Step S17, the relay node 300 transmits, to the radio base station 100, a Capability Indication message indicating the positioning capability of the relay node 300 (relay station capability information) in response to the Capability Request message from the radio base station 100.

In Step S18, the radio base station 100 stores the capability information indicated by the Capability Indication message from the radio terminal 200 and the capability information indicated by the Capability Indication message from the relay node 300.

In Step S19, the radio base station 100 allocates a radio resource to the radio terminal 200, the radio resource being used for a report on a result of radio quality measurement made in the radio terminal 200. The radio base station 100 then transmits, to the radio terminal 200, information on the allocation result (UL allocation).

In Step S20, the radio terminal 200 measures the radio quality of a received radio signal and transmits, to the radio base station 100, a Measurement Report message indicating the measurement result, under control of the radio base station 100.

In Step S21, the radio base station 100 judges whether or not making the radio terminal 200 execute handover is necessary based on the Measurement Report message from the radio terminal 200. To be more specific, for example, the radio base station 100 compares the radio quality of the radio base station 100 and the radio quality of a different node (a different radio base station or the relay node 300), and judges that making the radio terminal 200 execute handover is necessary if the radio quality of the different node is better than the radio quality of the radio base station 100.

In Step S22, the radio base station 100 judges whether or not a handover target for the radio terminal 200 is the relay node 300. The radio base station 100 judges whether or not the handover target is the relay node 300 based on a cell ID included in the Measurement Report message. If the handover target is the relay node 300, the process moves to the following process.

In Step S23, the radio base station 100 determines whether or not the location information of the radio terminal 200 is acquirable from the radio terminal 200 and whether or not the location information of the relay node 300 is acquirable from the relay node 300, based on the capability information stored in Step S18.

If it is determined that the location information is acquirable from each of the radio terminal 200 and the relay node 300, an operation according to a later-described first operation pattern starts. The first operation pattern is an operation pattern where the handover control according to any one of the above-described first to third operation examples is performed mainly by the radio base station 100.

On the other hand, if it is determined that the location information is not acquirable from each of the radio terminal 200 and the relay node 300, an operation according to a later-described second operation pattern starts. The second operation pattern is an operation pattern where the handover control according to any one of the above-described first to third operation examples is performed mainly by the mobility management device 500.

(1.2.2.2) First Operation Pattern

Figure 11:
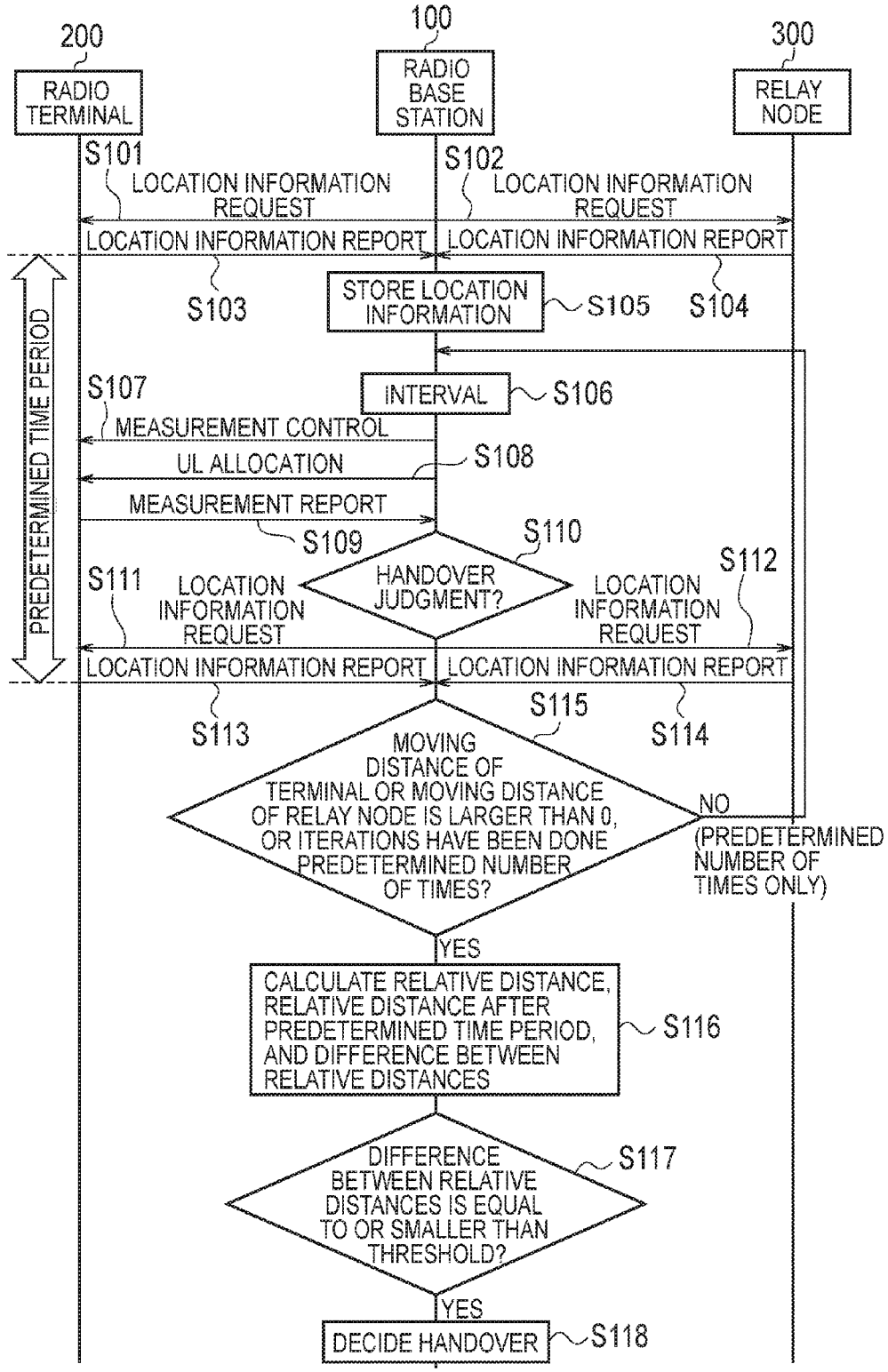
FIG. 11 is an operation sequence diagram showing a first operation pattern of the radio communication system according to the first embodiment.

FIG. 11 is an operation sequence diagram showing the first operation pattern of the radio communication system 1 according to the first embodiment. It is assumed here that the handover control operation according to the first operation example is performed.

In Step S101, the radio base station 100 transmits, to the radio terminal 200, a location information request to transmit information on a measurement result.

In Step S102, the radio base station 100 transmits, to the relay node 300, allocation information request to transmit information on a measurement result.

In Step S103, upon receiving the location information request, the radio terminal 200 performs positioning and transmits, to the radio base station 100, a location information report indicating the positioning result.

In Step S104, upon receiving the location information request, the relay node 300 performs positioning and transmits, to the radio base station 100, a location information report indicating the positioning result.

In Step S105, the radio base station 100 stores location information of the radio terminal 200 based on the location information report from the radio terminal 200. Besides, the radio base station 100 stores location information of the relay node 300 based on the location information report from the relay node 300.

In Step S106, the radio base station 100 counts a specified time period. When the specified time period is over, in Step S107 the radio base station 100 transmits information on Measurement Control to the radio terminal 200.

In Step S108, the radio base station 100 allocates a radio resource to the radio terminal 200, the radio resource being used for a report on a result of radio quality measurement made in the radio terminal 200. The radio base station 100 then transmits allocation information (UL allocation) to the radio terminal 200.

In Step S109, the radio terminal 200 measures the radio quality of a received radio signal and transmit s a measurement report (Measurement Report message) to the radio base station 100, under control of the radio base station 100.

In Step S110, the radio base station 100 judges whether or not making the radio terminal 200 execute handover is necessary based on the measurement report which is received from the radio terminal 200 in Step S115. To be more specific, for example, the radio base station 100 compares the radio quality of the radio base station 100 and the radio quality of the relay node 300, and judges that making the radio terminal 200 execute handover to the relay node 300 is necessary if the radio quality of the relay node 300 is better than the radio quality of the radio base station 100. If the radio base station 100 judges that making the radio terminal 200 execute handover to the relay node 300 is necessary, the process moves to the following process.

In Step S111, the radio base station 100 transmits a location information request to the radio terminal 200.

In Step S112, the radio base station 100 transmits a location information request to the relay node 300.

In Step S113, upon receiving the location information request, the radio terminal 200 performs positioning again and transmits a location information report indicating the positioning result to the radio base station 100.

In Step S114, upon receiving the location information request, the relay node 300 performs positioning again and transmits a location information report indicating the positioning result to the radio base station 100.

Here, a predetermined time period is defined as a time period for the radio base station 100 to receive the location information report from each of the radio terminal 200 and the relay node 300 again upon re-requesting location information since last receiving the location information report from each of the radio terminal 200 and the relay node 300.

In Step S115, the radio base station 100 calculates a moving distance of the radio terminal 200 and a moving distance of the relay node 300. If the moving distances of the radio terminal 200 and the relay node 300 are both equal to zero, the process returns to Step S106. Note that the number of times the radio base station 100 can iterate this process is limited and is set to a predetermined number of times (see FIG. 7). If at least one of the moving distance of the radio terminal 200 and the moving distance of the relay node 300 is larger than zero, the process moves to Step S116.

In Step S116, the radio base station 100 calculates a relative distance 1 based on the location information of the radio terminal 200 and the location information of the relay node 300 stored in Step S105, and calculates a relative distance 2 based on the location information report received in Steps S113 and S114. Then, the radio base station 100 calculates a difference between the relative distance 1 and the relative distance 2.

In Step S117, if the difference between the relative distance 1 and the relative distance 2 is equal to or smaller than a threshold, in Step S118 the radio base station 100 decides handover from the radio base station to the relay node 300 and transmits, to the radio terminal 200, an instruction of handover from the radio base station 100 to the relay node 300. On the other hand, if the difference between the relative distance 1 and the relative distance 2 is larger than the threshold in Step S117, the radio base station 100 cancels handover from the radio base station 100 to the relay node 300.

(1.2.2.3) Second Operation Pattern

Figure 12:
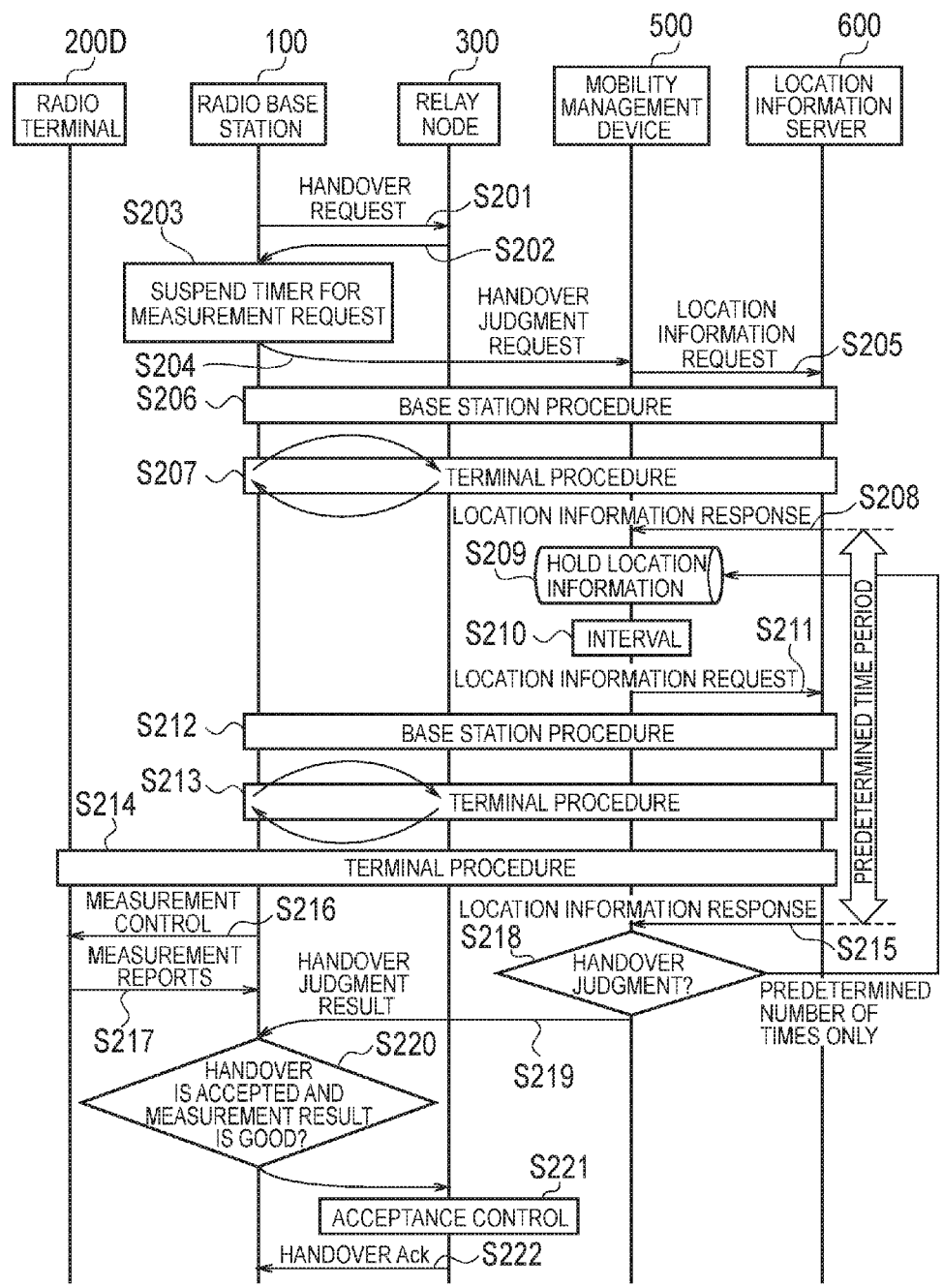
FIG. 12 is an operation sequence diagram showing a second operation pattern of the radio communication system according to the first embodiment.

FIG. 12 is an operation sequence diagram showing the second operation pattern of the radio communication system 1 according to the first embodiment. It is assumed here that the handover control operation according to the second or third operation example is performed.

In Step S201, the radio base station 100 transmits a handover request message to the relay node 300. Here, if judging that the handover target is the relay node 300, the radio base station 100 may transmit a judgment request message, which requests judgment on handover, to the mobility management device 500 without transmitting the handover request message to the relay node 300.

In Step S202, in response to the handover request message from the radio base station 100, the relay node 300 transmits a judgment request message to the mobility management device 500 to ask the core network 700 to make judgment on handover. Since the connection between the relay node 300 and the core network 700 is made by way of the radio base station 100, the radio base station 100 can recognize transmitting of the judgment request message to the mobility management device 500.

In Step S203, the radio base station 100 stops a handover-related timer when the judgment request message to the mobility management device 500 passes the radio base station 100. Note that, after a predetermined time period, the radio base station 100 performs a process for enabling a request to the radio terminal 200 for radio quality measurement.

In Step S204, the mobility management device 500 receives the judgment request message. In Step S205, the mobility management device 500 transmits, to the location information server 600, a location information request message requesting location information of the relay node 300.

In Steps S206 and S207, the location information server 600 measures the location information of the relay node 300 in response to the location information request message.

In Step S208, the location information server 600 transmits the result of location information measurement to the mobility management device 500.

In Step S209, the mobility management device 500 holds the location information of the relay node 300.

In Step S210, the mobility management device 500 waits for a lapse of a predetermined interval.

In Step S211, the mobility management device 500 transmits, to the location information server 600, a location information request message requesting location information of the relay node 300 and location information of the radio terminal 200.

In Steps S212 to S214, upon receiving the location information request message, the location information server 600 measures location information of the relay node 300 and location information of the radio terminal 200.

In Step S215, the location information server 600 transmits the result of location information measurement to the mobility management device 500.

Here, a predetermined time period is defined as a time period for the location information notice (Step S208) from the location information server 600 to arrive at the mobility management device 500 again since the location information notice (Step S215) from the location information server 600 arrives at the mobility management device 500 first.

In Step S218, the mobility management device 500 calculates a moving distance in accordance with the above operation examples. In the case of the second operation example, the process returns to Step S209 and Steps S209 to S215 are iterated if the moving distance of the relay node 300 is equal to 0. In the case of the third operation example, the process returns to Step S209 and Steps S209 to S215 are iterated if the moving distance of the radio terminal 200 and the moving distance of the relay node 300 are equal to 0. Note that the number of times the mobility management device 500 can iterate this process is limited and is set to a predetermined number of times.

After the predetermined number of times of iterations or after re-notification of the location information, in the case of the second operation example, the mobility management device 500 calculates a relative distance based on the location information of the radio terminal 200 and the location information of the relay node 300 if judging that the moving distance of the relay node 300 is not equal to 0; in the case of the third operation example, the mobility management device 500 calculates a relative distance based on the location information of the radio terminal 200 and the location information of the relay node 300 if the moving distance of the radio terminal 200 and the moving distance of the relay node 300 are not equal to 0.

If the calculated relative distance is equal to or smaller than a threshold, the mobility management device 500 makes a judgment to allow (accept) handover of the radio terminal 200 from the radio base station 100 to the relay node 300. If the calculated relative distance is equal to or larger than the threshold, the mobility management device 500 makes a judgment to reject (deny) handover of the radio terminal 200 from the radio base station 100 to the relay node 300.

In Step S219, the mobility management device 500 transmits information on the judgment result to the radio base station 100.

Meanwhile, in Step S216, the radio base station 100 allocates a resource to the radio terminal 200 so that the radio terminal 200 can notify the radio base station 100 of the result of radio quality measurement.

In Step S217, the radio terminal 200 notifies the radio base station 100 of the result of radio quality measurement in accordance with an instruction from the radio base station 100. The measurement result includes information on the radio quality between the radio terminal 200 and the relay node 300.

In Step S220, the radio base station 100 decides whether or not to make the radio terminal 200 execute handover from the radio base station 100 to the relay node 300 based on the information on the judgment result received from the mobility management device 500 in Step S219 and on the measurement result received from the radio terminal 200 in Step S217.

In this process, the radio base station 100 decides to make the radio terminal 200 execute handover from the radio base station 100 to the relay node 300 if the handover is judged as allowable (acceptable) by the mobility management device 500 and if the radio quality between the radio terminal 200 and the relay node 300 is good. If deciding to make the radio terminal 200 execute handover, the radio base station 100 checks whether or not the relay node 300 is capable of accepting the radio terminal 200, and then transmits, to the radio terminal 200, an instruction of handover to the relay node 300.

(1.3) Effect of First Embodiment

As has been described, according to the first embodiment, if the value of the change (difference) in the relative distance is larger than the threshold, the radio base station 100 performs control not to make the radio terminal 200 execute handover from the radio base station 100 to the relay node 300 even when the level of the radio quality between the radio terminal 200 and the relay node 300 is higher than the level of the radio quality between the radio terminal 200 and the radio base station 100.

Such handover control makes it possible to make the radio terminal 200 execute handover to the relay node 300 when the radio terminal 200 is located in the transportation equipment T and not execute handover to the relay node 300 when the radio terminal 200 is not located in the transportation equipment T. Thus, the occurrence of the processing load and communication delay due to unnecessary handover can be prevented.

In particular, the overhead due to handover from the radio base station 100 to the relay node 300 is larger than the overhead due to handover from one radio base station to another. The first embodiment can reduce the probability of the handover from the radio base station 100 to the relay node 300, and thereby can suppress the overhead.

Further, the value of the change (difference) in the relative distance is not calculated when the moving distance of the radio terminal 200 and the moving distance of the radio base station 100 are both equal to zero; and the value of the change (difference) in the relative distance is calculated when at least one of the moving distance of the radio terminal 200 and the moving distance of the radio base station 100 is larger than zero. Thereby, judgment accuracy can be improved.

In the first embodiment, the handover controller 126 transmits a location information request to the radio terminal 200 and to the relay node 300 when the level of the radio quality between the radio terminal 200 and the relay node 300 is higher than the level of the radio quality between the radio terminal 200 and the radio base station 100. In other words, the handover controller 126 does not transmit a location information request to the radio terminal 200 and to the relay node 300 when the level of the radio quality between the radio terminal 200 and the relay node 300 is equal to or lower than the level of the radio quality between the radio terminal 200 and the radio base station 100.

This makes it possible to make the radio terminal 200 and the relay node 300 transmit a location information report only when handover is required. Thereby, the overhead can be reduced as compared to the case where the radio terminal 200 and the relay node 300 each transmit a location information report regularly.

In the second or third operation example according to the first embodiment, the relative distance between the radio terminal 200 and the relay node 300 is regarded as zero if the handover target is the relay node 300. Thereby, a procedure of measuring location information of the radio terminal 200 upon handover request can be omitted. Accordingly, handover-related calculation can be reduced.

Besides, according to the second or third operation example, in the case where the relay node 300 is moved, the handover to the relay node 300 is controlled based on the relative distance between the location of the relay node 300 and that of the radio terminal 200 after a lapse of the predetermined time period. Thereby, a process of calculating the moving distance of the radio terminal 200 can be curtailed.

In the first embodiment, the location information measurement is carried out by the core network 700 (specifically, the location information server 600). Accordingly, the first embodiment is applicable also to a case where the radio terminal 200 or the relay node 300 does not have a system, such as GPS, which enables itself to measure its location information. Moreover, control signals among the radio terminal 200, the radio base station 100, and the core network 700 can be reduced, thus reducing the traffic load.

In the first embodiment, the radio base station 100 can select an appropriate operation pattern between the first operation pattern and the second operation pattern described above based on the positioning capability of the radio terminal 200 and the positioning capability of the relay node 300. More specifically, the radio base station 100 knows the positioning capability of the radio terminal 200 and the positioning capability of the relay node 300. The radio base station 100 thereby determines whether or not the location information of the radio terminal 200 is acquirable from the radio terminal 200 itself and whether or not the location information of the relay node 300 is acquirable from the relay node 300 itself.

Hence, the radio base station 100 can omit the process of acquiring the location information of the radio terminal 200 from the location information server 600 if the location information of the radio terminal 200 is acquirable from the radio terminal 200 itself. Moreover, the radio base station 100 can omit the process of acquiring the location information of the relay node 300 from the location information server 600 if the location information of the relay node 300 is acquirable from the relay node 300 itself. Accordingly, according to the first operation pattern 1, no signaling occurs between the radio base station 100 and the location information server 600, and an increase of network traffic can be suppressed.

(2) Second Embodiment

In the second embodiment, description is given of a case of carrying out a measurement process for acquiring radio quality information and location information by use of a radio terminal 200. Such a technique is referred to as MDT (Minimization of Drive Test).

In the radio communication system, the radio transmission environment around a radio base station 100 changes if a building is built near the radio base station 100 or installation conditions of its neighboring radio base stations change after the radio base station 100 is installed.

Against this background, it has been a conventional practice to regularly acquire radio quality information on radio transmission environment using a measurement vehicle having measurement equipment on board. Specifically, the radio quality is measured at various locations in the communication area by using the measurement vehicle.

Such an acquisition method has a problem in a large number of man-hours and high cost. To deal with this problem, MDT automates the acquisition work by using a radio terminal 200 of the user (see 3GPP TR36.805 and TS37.320).

(2.1) Overall Configuration of Radio Communication System

Figure 13:
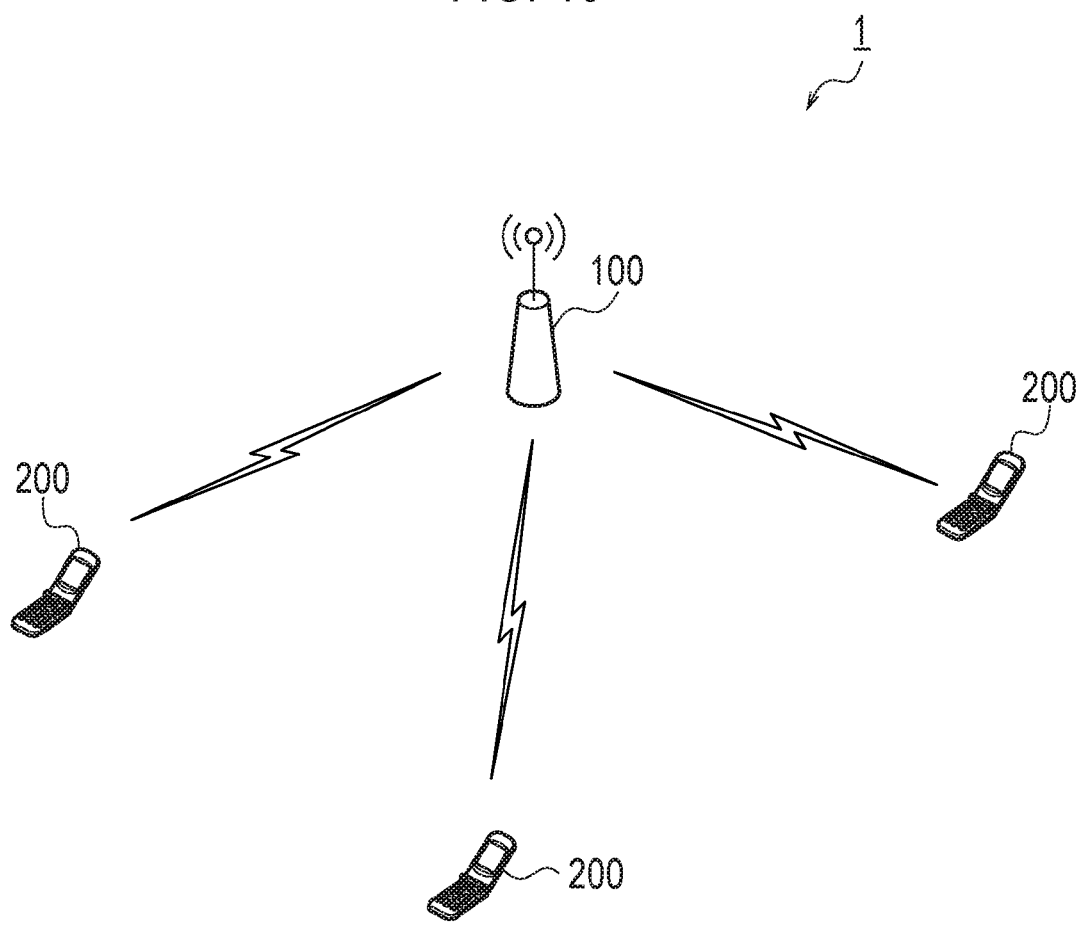
FIG. 13 is a diagram showing a schematic configuration of a radio communication system according to a second embodiment.

FIG. 13 is a diagram showing a schematic configuration of a radio communication system 1 according to the second embodiment. Note that, in FIG. 13, the mobility management device 500 and the location information server 600 described in the first embodiment are not illustrated.

As shown in FIG. 13, the radio communication system 1 according to the second embodiment includes: a radio base station 100; and multiple radio terminals 200. The radio communication system 1 is configured based, for example, on LTE-Advanced which is positioned as a fourth-generation (4G) mobile system.

The radio base station 100 is a macro base station which forms a cell having a radius of around several hundred meters, for example. The cell formed by the radio base station 100 indicates a communication area in which connection with the radio base station 100 can be achieved. The radio base station 100 is connected to an unillustrated backhaul network.

Each radio terminal 200 is located in the cell formed by the radio base station 100, and is connected to the radio base station 100 by radio to perform communications.

The radio terminal 200 is held by a user U and is moved along with the movement of the user U. The radio terminal 200 may be a mobile terminal or may be a card-type communication terminal.

The radio terminal 200 measures the radio quality of a radio signal received. Here, examples of the radio quality include the received power of a reference signal (RSRP) transmitted periodically and the received quality of the reference signal (RSRQ). The radio terminal 200 measures not only the radio quality of a radio signal received from the connection target radio base station 100 but also the radio quality of a receivable radio signal. The radio terminal 200 measures the radio quality regularly. Alternatively, the radio terminal 200 may measure the radio quality when the level of the radio quality between itself and the connection target radio base station 100 falls below a predetermined level, for example.

Some of the radio terminals 200 have a positioning system, such as GPS, which enables the radio terminal 200 itself to measure its location information and the others don't have such a system. In the case of acquiring location information of the radio terminal 200 not having the positioning system, the radio base station 100 needs to acquire the location information from a location information server 600. Thus, signaling occurs between the radio base station 100 and the location information server 600. Besides, it is not possible to accurately measure the location of a radio terminal in an idle mode.

In accordance with the MDT configuration, the radio base station 100 acquires radio quality information and location information by use of the radio terminal 200. If the radio terminal 200 not having a positioning system such as GPS is used for MDT in this process, this results in an increase of network (backhaul) traffic due to signaling. Moreover, it is not possible to accurately measure the location of a radio terminal in an idle mode. For the above reasons, a radio terminal to be used for MDT is selected based on the location measurement capability (positioning capability) of each radio terminal.

(2.2) Configuration of Radio Base Station

Figure 14:
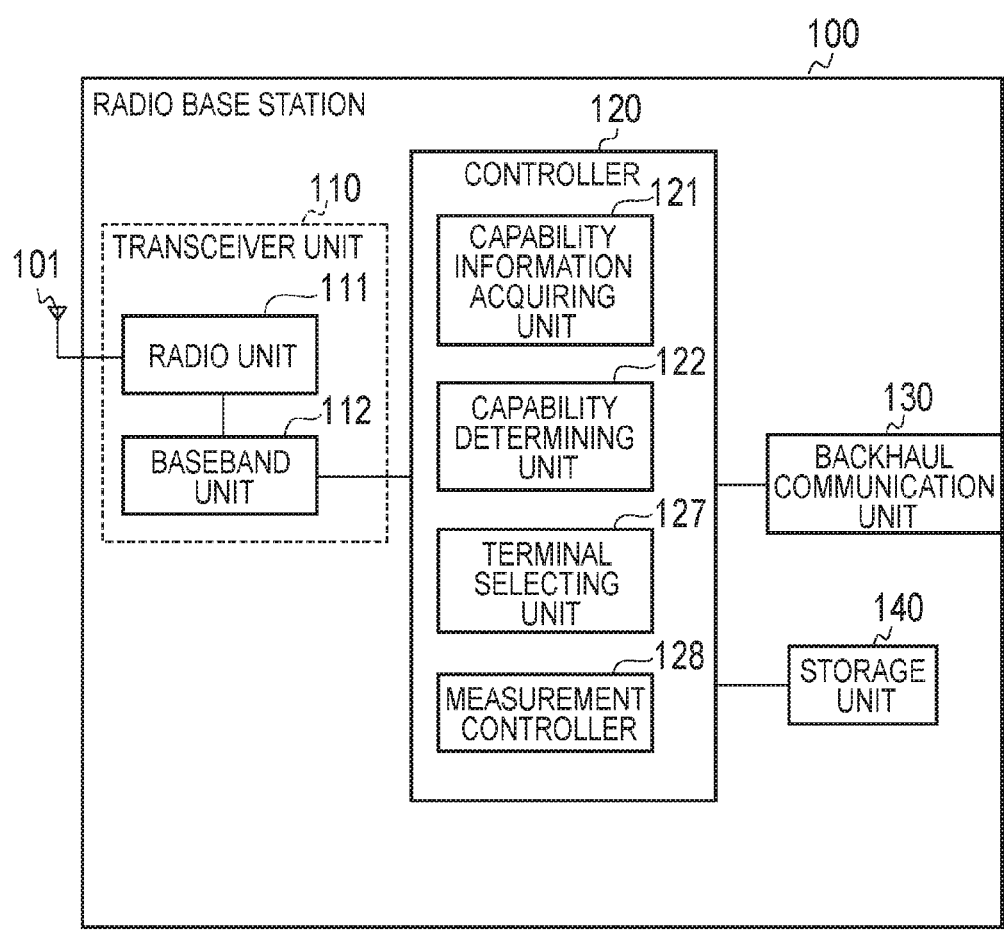
FIG. 14 is a block diagram showing a configuration of a radio base station according to the second embodiment.

FIG. 14 is a block diagram showing a configuration of the radio base station 100 according to the second embodiment.

As shown in FIG. 14, the radio base station 100 according to the second embodiment includes: an antenna 101; a transceiver unit 110; a controller 120; a backhaul communication unit 130; and a storage unit 140.

The transceiver unit 110 includes: a radio unit 111 that processes radio signals; and a baseband unit 112 that processes baseband signals. The transceiver unit 110 exchanges radio signals with each radio terminal 200 through the antenna 101.

The controller 120 includes a CPU, for example, and controls various functions that the radio base station 100 has. The backhaul communication unit 130 communicates with another radio base station via the backhaul network. The storage unit 140 includes a memory, for example, and stores various kinds of information used for, for example, the control of the radio base station 100.

The controller 120 includes: a capability information acquiring unit 121; a capability determining unit 122; a terminal selecting unit 127; and a measurement controller 128.

The capability information acquiring unit 121 acquires information on the positioning capability of each radio terminal 200 being connected to the radio base station 100 (terminal capability information).

The capability determining unit 122 determines whether or not location information of each radio terminal 200 being connected to the radio base station 100 is acquirable from the radio terminal 200 based on the terminal capability information. The capability determining unit 122 determines, for each of the multiple radio terminals 200, whether or not the radio terminal is capable of acquiring location information by itself based on the terminal capability information from the radio terminal 200.

The terminal selecting unit 127 selects the radio terminal 200 to be used for the measurement process (MDT) based on the result of judgment made by the capability determining unit 122.

The measurement controller 128 controls the measurement of radio quality information and location information performed by the radio terminal 200.

(2.3) Operation of Radio Communication System

FIG. 15 is a sequence diagram showing an operation sequence of the radio communication system 1 according to the second embodiment.

As shown in FIG. 15, in Step S301, the radio base station 100 checks whether or not to start a MDT measurement process. The MDT measurement process may be performed regularly, or instead may be performed in response to an instruction from a server of an operator. If the MDT measurement process is to be started, the process moves to Step S302.

In Step S302, the radio base station 100 transmits, to each radio terminal 200, a Capability Request message requesting a transmission of terminal capability information indicating the positioning capability of the radio terminal 200 (capability information transmission request).

In Step S303, each radio terminal 200 transmits, to the radio base station 100, a Capability Indication message indicating its positioning capability (terminal capability information) in response to the Capability Request message from the radio base station 100.

In Step S304, the radio base station 100 determines what kind of location measurement capability (positioning capability) each radio terminal 200 has, based on the terminal capability information from the radio terminal 200. Then, based on the measurement capability information of each radio terminal 200, the radio base station 100 selects which radio terminal 200 is to be used for the measurement process (MDT).

In Step S305, the radio base station 100 transmits, to the radio terminal 200 to be used for the measurement process (MDT), information on control over radio quality information/location information measurement (MDT indication).

The radio terminal 200 to be used for the measurement process (MDT) measures the radio quality of a received radio signal and the location as well as transmits the radio base station 100 a Measurement Report message indicating the measurement result upon request from a network, under control of the radio base station 100.

The radio base station 100 transmits the radio quality information and the location information thus acquired to the server of the operator, or uses them for adjusting communication parameters of the radio base station 100.

(2.4) Effect of Second Embodiment

As has been described, according to the second embodiment, the radio base station 100 selects the radio terminal 200 having the positioning system such as GPS among the multiple radio terminals 200 and uses this in MDT, for example. Thereby, the process of acquiring location information of the radio terminal 200 from the location information server 600 can be omitted. As a result, an increase of network (backhaul) traffic due to signaling between the radio base station 100 and the location information server 600 can be suppressed. In addition, accurate location measurement can be carried out even in the case where MDT is performed using a radio terminal in an idle mode.

(3) Other Embodiments

Although contents of the present invention have been described according to the foregoing embodiments, it should not be understood that descriptions and drawings constituting part of this disclosure limit the present invention. From this disclosure, various alternative embodiments, examples, and operation techniques will be found by those skilled in the art.

Although the radio communication system based on LTE-Advanced has been shown as an example in the foregoing embodiments, the present invention may be applied to another radio communication system such as a radio communication system based on Mobile WiMAX (IEEE 802.16e) instead of LTE-Advanced.

As described above, it should be understood that the present invention includes various embodiments and the like which are not described herein. Accordingly, the scope of the present invention should be determined only by the matters specifying the invention in the scope of claims regarded as appropriate based on this disclosure.

Note that the entire contents of Japanese Patent Application No. 2010-169797 (filed on Jul. 28, 2010) are incorporated herein by reference.

INDUSTRIAL APPLICABILITY

As has been described, the radio base station and the method of controlling the same according to the present invention are capable of suppressing an increase of network traffic even when a process requiring acquisition of radio terminal location information is carried out, and thus are useful in radio communications such as mobile communications.

The invention claimed is:

1. A radio base station comprising:
a transmitter that transmits, to a radio terminal being connected to the radio base station, a capability information transmission request for requesting a transmission of terminal capability information indicating a positioning capability of the radio terminal, wherein the terminal capability information indicates whether the radio terminal has a positioning system capable of acquiring location information without an assist from a network;
a receiver that receives the terminal capability information transmitted from the radio terminal; and
a determination unit that determines whether or not location information indicating a geographical location of the radio terminal is acquirable during an idle state of the radio terminal, based on the terminal capability information received by the receiver, wherein
based on a result of the determination, the transmitter further transmits Minimization of Drive Tests (MDT) configuration information to the radio terminal and then transmits a request different from the MDT configuration information to the radio terminal, the MDT configuration information relating to MDT measurement for radio qualities and location information, the request requesting transmission of MDT measurement results of the radio qualities and the location information, wherein the MDT measurement includes periodic measurement for the radio qualities, the radio qualities including first radio quality of a serving cell and second radio quality of other cells, and each of the first and second radio qualities including Reference Signal Received Power (RSRP) and/or Reference Signal Received Quality (RSRQ), and
the receiver further receives the MDT measurement results from the radio terminal, wherein the MDT measurement results are obtained by the radio terminal during the idle state of the radio terminal.

2. A radio terminal comprising:
a transmitter that transmits terminal capability information indicating a positioning capability of the radio terminal, wherein the terminal capability information is used for determining, by a network, whether or not location information indicating a geographical location of the radio terminal is acquirable during an idle state of the radio terminal, and the terminal capability information indicates whether the radio terminal has a positioning system capable of acquiring location information without an assist from the network;
a receiver that receives, from the network, Minimization of Drive Tests (MDT) configuration information relating to MDT measurement for radio qualities and the location information, wherein transmission of the MDT configuration information is based on the determination by the network using the terminal capability information, and the MDT measurement includes periodic measurement for the radio qualities, the radio qualities including first radio quality of a serving cell and second radio quality of other cells, and each of the first and second radio qualities including Reference Signal Received Power (RSRP) and/or Reference Signal Received Quality (RSRQ);

a controller that measures the radio qualities and the location information during idle state of the radio terminal, based on the MDT configuration information;

the receiver receives, from the network, a request requesting transmission of MDT measurement results of the radio qualities and the location information; and the transmitter that transmits the MDT measurement results to the network in response to reception of the request, wherein the MDT measurement results are obtained during the idle state of the radio terminal.

3. An apparatus for controlling a radio terminal, comprising:

processor configured to execute processes of:

transmitting terminal capability information indicating a positioning capability of the radio terminal, wherein the terminal capability information is used for determining, by a network, whether or not location information indicating a geographical location of the radio terminal is acquirable during an idle state of the radio terminal, and the terminal capability information indicates whether the radio terminal has a positioning system capable of acquiring location information without an assist from the network;

receiving, from the network, Minimization of Drive Tests (MDT) configuration information relating to MDT measurement for radio qualities and the location information, wherein transmission of the MDT configuration information is based on the determination by the network using the terminal capability information, and the MDT measurement includes a periodic measurement for the radio qualities, the radio qualities including first radio quality of a serving cell and second radio quality of other cells, and each of the first and second radio qualities including Reference Signal Received Power (RSRP) and/or Reference Signal Received Quality (RSRQ);

measuring the radio qualities and the location information during idle state of the radio terminal, based on the MDT configuration information;

receiving, from the network, a request requesting transmission of MDT measurement results of the radio qualities and the location information; and transmitting the MDT measurement results to the network in response to reception of the request, wherein the MDT measurement results are obtained during the idle state of the radio terminal.

* * * * *